United States Patent
Yoshida et al.

(10) Patent No.: US 11,558,121 B2
(45) Date of Patent: Jan. 17, 2023

(54) OPTICAL TRANSMITTER AND CONTROL METHOD FOR OPTICAL TRANSMITTER

(71) Applicant: FUJITSU LIMITED, Kawasaki (JP)

(72) Inventors: Setsuo Yoshida, Inagi (JP); Shoichiro Oda, Fuchu (JP); Kazuyuki Tajima, Yokosuka (JP); Takeshi Hoshida, Kawasaki (JP); Takahito Tanimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/364,929

(22) Filed: Jul. 1, 2021

(65) Prior Publication Data

US 2022/0109506 A1 Apr. 7, 2022

(30) Foreign Application Priority Data

Oct. 5, 2020 (JP) .............................. JP2020-168148

(51) Int. Cl.
*H04B 10/04* (2006.01)
*H04B 10/564* (2013.01)
(Continued)

(52) U.S. Cl.
CPC ......... *H04B 10/564* (2013.01); *G02F 1/0123* (2013.01); *G02F 1/212* (2021.01); *H04B 10/07955* (2013.01); *H04B 10/616* (2013.01)

(58) Field of Classification Search
CPC ............ H04B 10/564; H04B 10/07955; H04B 10/616; H04B 10/505; H04B 10/5055; H04B 10/60; H04B 10/50; H04B 10/5057; H04B 10/50572; H04B 10/50575; H04B 10/50577; H04B 10/5059;
(Continued)

(56) References Cited

U.S. PATENT DOCUMENTS

2016/0099776 A1* 4/2016 Nakashima ........ H04B 10/2507
398/186
2016/0127049 A1* 5/2016 Randel ............... H04B 10/5165
398/115

FOREIGN PATENT DOCUMENTS

JP 2008-124893 A 5/2008

OTHER PUBLICATIONS

Ginni Khanna et al., "A Robust Adaptive Pre-Distortion Method for Optical Communication Transmitters", IEEE Photonics Technology Letters, vol. 28, No. 7, pp. 752-755, Apr. 1, 2016 (Total 4 pages).
(Continued)

*Primary Examiner* — Hibret A Woldekidan
(74) *Attorney, Agent, or Firm* — Fujitsu Patent Center

(57) ABSTRACT

An optical transmitter includes: a modulator, square law detector, and a processor. The modulator generates an optical signal indicating transmission data. The square law detector detects an intensity of the optical signal using a photodetector and output first intensity data indicating the detected intensity. The processor calculates, based on the transmission data, an electric field of the optical signal generated by the modulator by using parameters pertaining to a state of the modulator. The processor calculates second intensity data indicating the intensity of the optical signal based on the calculated electric field. The processor updates the parameters so as to reduce a difference between the first intensity data and the second intensity data. The processor controls the state of the modulator based on the parameters.

9 Claims, 17 Drawing Sheets

(51) Int. Cl.
*H04B 10/61* (2013.01)
*G02F 1/01* (2006.01)
*G02F 1/21* (2006.01)
*H04B 10/079* (2013.01)

(58) Field of Classification Search
CPC ........ H04B 10/50593; H04B 10/50595; H04B 10/50597; H04B 10/54; H04B 10/541; H04B 10/548; H04B 10/2507; H04B 10/588; G02F 1/212; G02F 1/0123
USPC ........ 398/182, 183, 186, 192, 195, 197, 198
See application file for complete search history.

(56) References Cited

OTHER PUBLICATIONS

C.R.S. Fludger et al., "Low Cost Transmitter Self-Calibration of Time Delay and Frequency Response for High Baud-Rate QAM Transceivers", OFC 2017, OSA 2017, Th1D.3 (Total 3 pages).
Yangyang Fan et al., "Overall Frequency Response Measurement of DSP-based Optical Transmitter Using Built-in Monitor Photodiode", ECOC 2016, 42nd European Conference and Exhibition on Optical Communications, Sep. 18-22, 2016, pp. 1130-1132 (Total 3 pages).
Junli Liang et al., "Phase Retrieval via the Alternating Direction Method of Multipliers", IEEE Signal Processing Letters, vol. 25, No. 1, Jan. 2018, 25(1), pp. 5-9 (2018) (Total 5 pages).

* cited by examiner

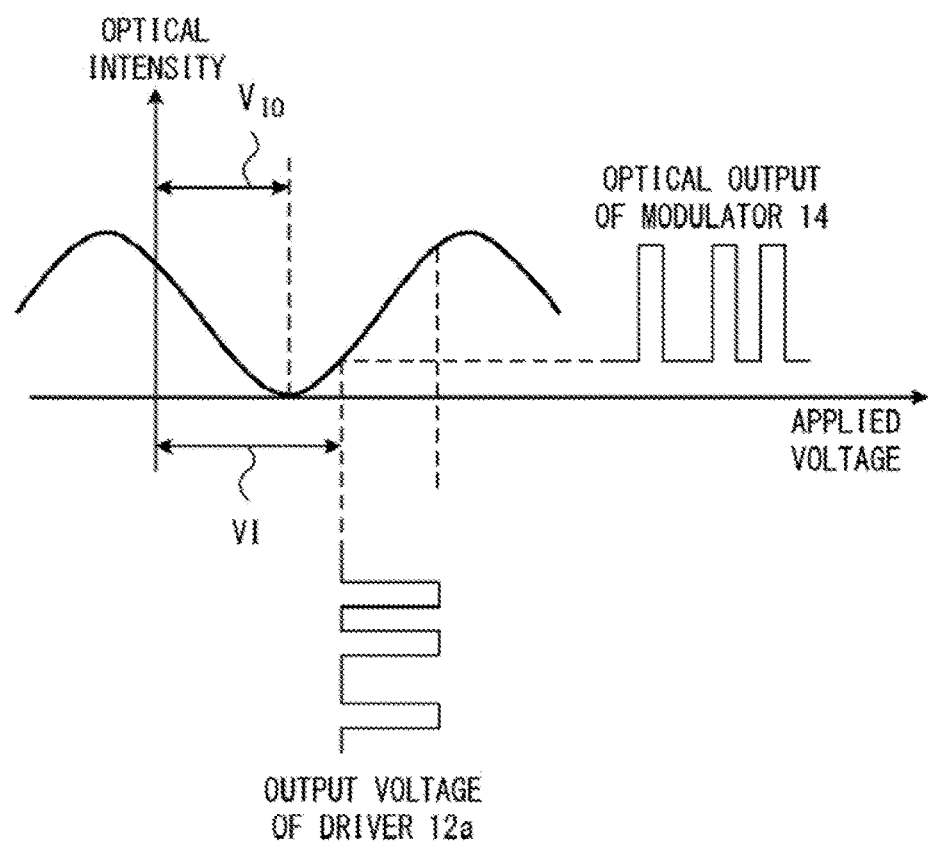
F I G. 2

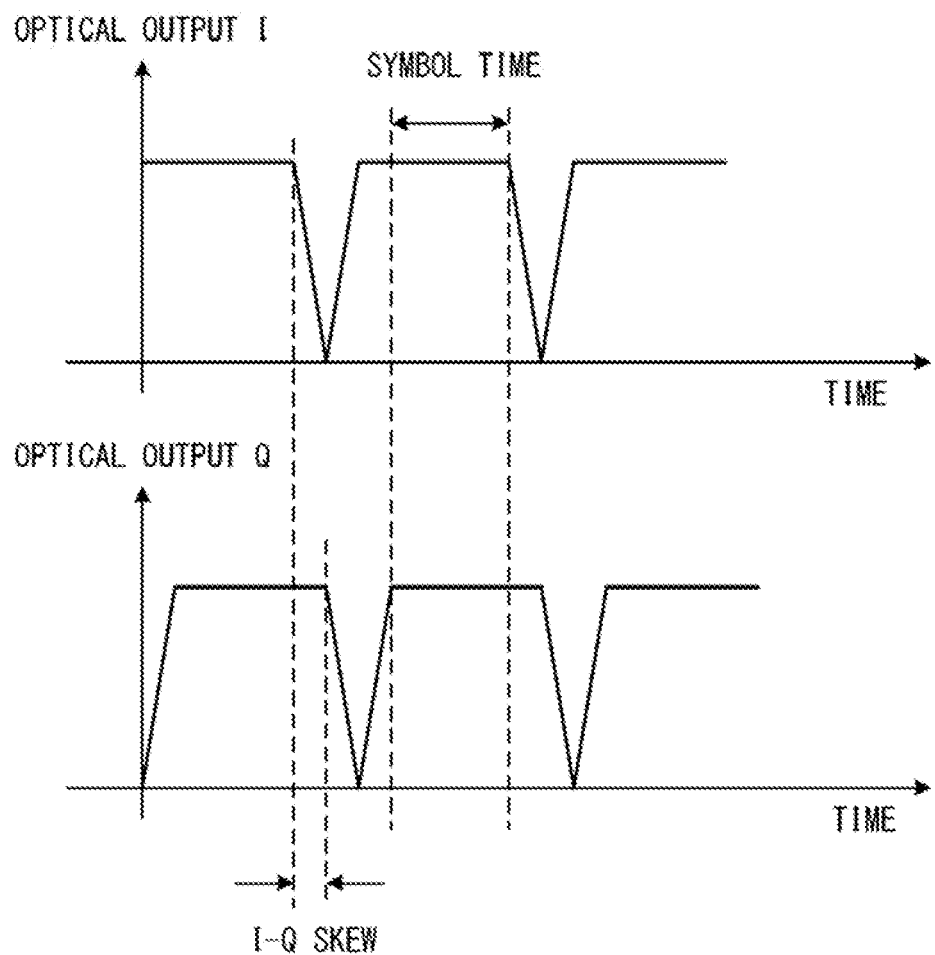
F I G. 6

<MODULATOR 1>    <VIRTUAL MODULATOR 41>
VI : 1.0          VI : 1.0
                  ΔRe : 0

<MODULATOR 1>    <VIRTUAL MODULATOR 41>
VI : 1.0          VI : 1.0
                  ΔRe : 0

<MODULATOR 1>    <VIRTUAL MODULATOR 41>
VI : 1.0          VI : 1.0
                  ΔRe : 0 → 0.2

<MODULATOR 1>    <VIRTUAL MODULATOR 41>
VI : 1.0 → 0.8    VI : 1.0
                  ΔRe : 0.2

<MODULATOR 1>    <VIRTUAL MODULATOR 41>
VI : 0.8          VI : 1.0 → 0.8
                  ΔRe : 0.2 → 0

OPTICAL TRANSMITTER AND CONTROL METHOD FOR OPTICAL TRANSMITTER

CROSS-REFERENCE TO RELATED APPLICATION

This application is based upon and claims the benefit of priority of the prior Japanese Patent Application No. 2020-168148, filed on Oct. 5, 2020, the entire contents of which are incorporated herein by reference.

FIELD

The embodiments discussed herein are related to an optical transmitter and a method for controlling the optical transmitter.

BACKGROUND

For implementing a large-capacity communication system, there is demand for optical transmitters that generate a high-quality optical signal. The optical transmitter includes an optical modulator that generates an optical signal from transmission data. The optical transmitter transmits the optical signal generated by the optical modulator.

The state of the optical transmitter may change according to various factors. For example, the state or property of the optical modulator may change depending on the ambient temperature. When the state of the optical transmitter changes, the quality of the optical signal may be reduced. Thus, a proposed method is one wherein the state of an optical transmitter is monitored and controlled in accordance with the monitoring result. For example, in a proposed method, the state of an optical signal is monitored using a coherent receiver, and the signal is corrected in accordance with the monitoring result (e.g., Ginni Khanna et al. *A Robust Adaptive Pre-Distortion Method for Optical Communication Transmitters*, IEEE PHOTONICS TECHNOLOGY LETTERS, VOL. 28, NO. 7, Apr. 1, 2016). As a related art, a dispersion pre-equalization optical transmitter that performs dispersion pre-equalization has been proposed (e.g., Japanese Laid-open Patent Publication No. 2008-124893).

In the prior art, a circuit for monitoring and controlling the state of an optical transmitter consumes large power. For example, when a coherent receiver is implemented in an optical transmitter, the coherent receiver will consume large power. In addition, the cost for the optical transmitter will be high.

SUMMARY

According to an aspect of the embodiments, an optical transmitter includes: a modulator configured to generate an optical signal indicating transmission data; a square law detector configured to detect an intensity of the optical signal using a photodetector and output first intensity data indicating the detected intensity; and a processor configured to calculate, based on the transmission data, an electric field of the optical signal generated by the modulator by using parameters pertaining to a state of the modulator, calculate second intensity data indicating the intensity of the optical signal based on the calculated electric field, update the parameters so as to reduce a difference between the first intensity data and the second intensity data, and control the state of the modulator based on the parameters.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of an effect caused by deviation of a bias voltage of a modulator;

FIG. 6 illustrates an example of an effect caused by an I-Q skew;

DESCRIPTION OF EMBODIMENTS

Figure 1:
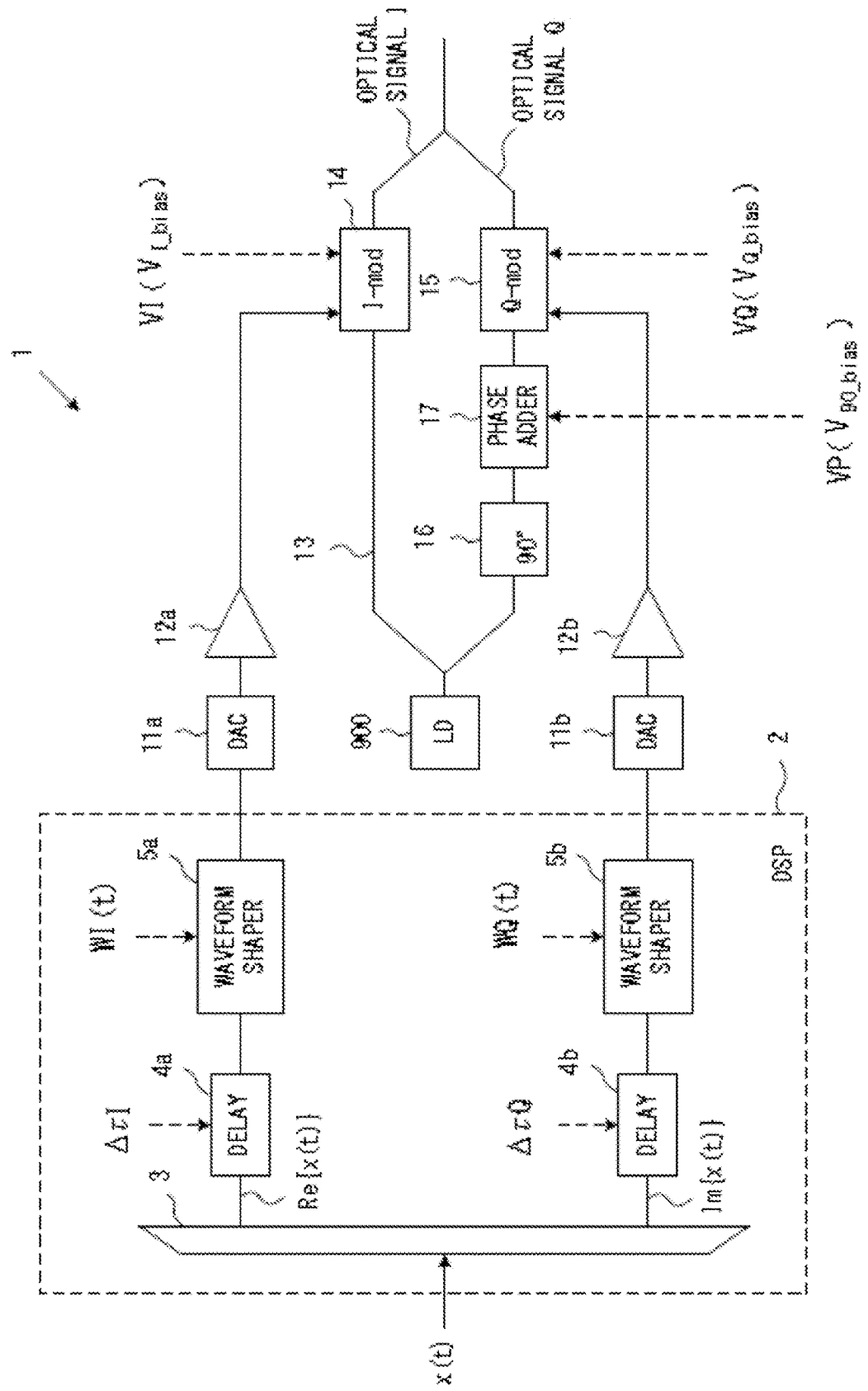
FIG. 1 illustrates an example of a modulator implemented in an optical transmitter.

FIG. 1 illustrates an example of a modulator implemented in an optical transmitter. In this example, a modulator 1 includes a digital signal processor (DSP) 2, digital-to-analog converters (DACs) 11a and 11b, drivers 12a and 12b, and an IQ modulator 13. The modulator 1 may include other circuits or functions that are not depicted in FIG. 1. A laser light source (LD) 900 may be provided outside the modulator 1.

A data signal x is generated from transmission data by a signal generator (not illustrated). A data signal x is generated for each of symbols in accordance with a designated modulation scheme. Each of the symbols indicates transmission data having as many bits as correspond to the designated modulation scheme. For example, two bits may be allocated to each symbol in QPSK, and four bits may be allocated to each symbol in 16QAM. A data signal x is represented by a complex number.

The DSP 2 includes an IQ separator unit 3, delay adjusters 4a and 4b, and waveform shapers 5a and 5b. However, the DSP 2 may have other functions that are not depicted in FIG. 1. For each symbol, the IQ separator unit 3 separates a data signal x represented by a complex number into a real part and an imaginary part. The real part may hereinafter be referred to as a "data signal Re" or a "data signal Re(x)." The imaginary part may be referred to as a "data signal Im" or a "data signal Im(x)."

The delay adjuster 4a delays a data signal Re. The waveform shaper 5a shapes the waveform of an output signal of the delay adjuster 4a. The delay adjuster 4b delays a data signal Im. The waveform shaper 5b shapes the waveform of an output signal of the delay adjuster 4b. A delay amount is designated for the delay adjusters 4a and 4b by a controller (not illustrated). Processing of the waveform shapers 5a and 5b is also controlled by the controller (not illustrated).

The DAC 11a converts a data signal Re generated by the DSP 2 into an analog signal. The driver 12a amplifies the data signal Re output from the DAC 11a. Likewise, the DAC 11b converts a data signal Im generated by the DSP 2 into an analog signal. The driver 12b amplifies the data signal Im output from the DAC 11b.

The IQ modulator 13 is a Mach-Zehnder modulator and includes an I-arm waveguide and a Q-arm waveguide. An I-component modulator 14 is provided on the I-arm waveguide. A Q-component modulator 15, a fixed phase shifter 16, and a phase adder 17 are provided on the Q-arm waveguide. Continuous wave light generated by the laser light source 900 is input to the IQ modulator 13. The continuous wave light is guided to the I-arm waveguide and the Q-arm waveguide.

The I-component modulator 14 is a Mach-Zehnder modulator and modulates continuous wave light with a data signal Re so as to generate an optical signal I. The Q-component modulator 15 is a Mach-Zehnder modulator and modulates continuous wave light with a data signal Im so as to generate an optical signal Q. The fixed phase shifter 16 provides a specified phase difference (e.g., π/2) between the I-arm waveguide and the Q-arm waveguide. However, a phase difference generated by the fixed phase shifter 16 may have an offset from a target value. The phase adder 17 shifts the phase of light passing through the Q-arm waveguide. The phase-shift amount of the phase adder 17 is controlled by a bias voltage VP (may be denoted as "$V_{90\_bias}$"). The optical signal I and the optical signal Q are combined to generate a modulated optical signal indicating transmission data. An operation point of the I-component modulator 14 is controlled by a bias voltage VI (may be denoted as "$V_{i\_bis}$"). An operation point of the Q-component modulator 15 is controlled by a bias voltage VQ (may be denoted as "$V_{Q\_bis}$").

When the state of the optical transmitter that includes the modulator 1 is correctly controlled, the quality of an optical signal generated by the modulator 1 is good. In other words, when the state of the optical transmitter is not correctly controlled, the quality of a generated optical signal may be reduced. For example, the quality of a generated optical signal may be reduced when the bias voltage of the modulator 1 deviates from an optimum value.

FIG. 2 illustrates an example of an effect caused by deviation of a bias voltage of the modulator. In this example, an input electric signal and an output optical signal provided when a bias voltage VI is applied to the I-component modulator 14 in FIG. 1 are illustrated.

The I-component modulator 14 is operated as an intensity modulator. Thus, an optical signal with an intensity corresponding to an output voltage of the driver 12a is generated. In this example, the operation point of the I-component modulator 14 is adjusted by the bias voltage VI. When the bias voltage VI has been adjusted to a target value $V_{I0}$, the intensity of output light of the I-component modulator 14 is substantially zero when a data signal is "0." However, when the bias voltage VI deviates from the target value $V_{I0}$, the intensity of output light of the I-component modulator 14 is, as depicted in FIG. 2, not zero when the data signal is "0." Thus, an extinction ratio of the output optical signal worsens. This problem may occur similarly in the I-component modulator 14 and the Q-component modulator 15.

Figure 3A:
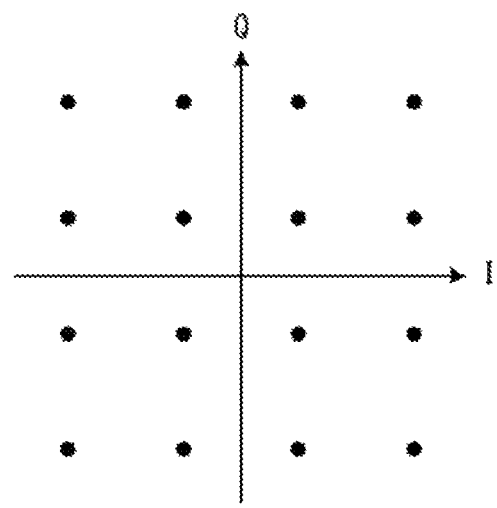
FIGS. 3A and 3B illustrate an example of an effect caused by deviation of a bias voltage for controlling an I-Q phase difference.
Figure 3B:
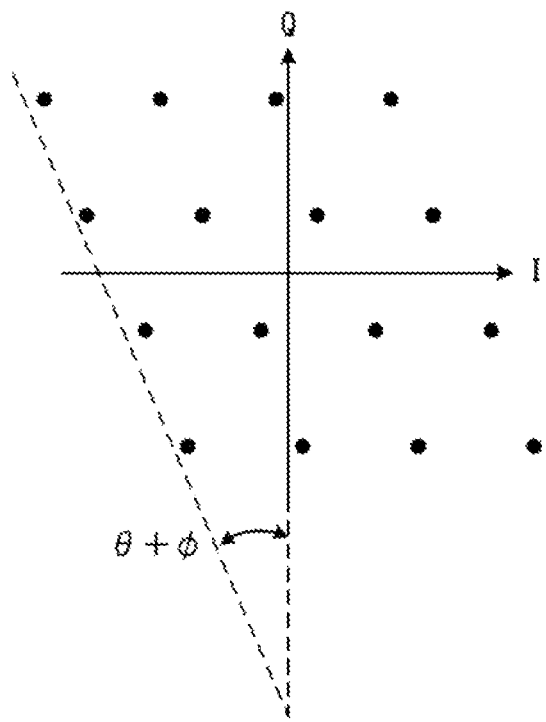

FIGS. 3A and 3B illustrate an example of an effect caused by deviation of a bias voltage for controlling an I-Q phase difference. In FIGS. 3A and 3B, the modulator 1 generates a 16QAM optical signal. Thus, four bits are allocated to each symbol. In this case, each symbol is mapped to one of 16 signal points depicted in FIGS. 3A and 3B in accordance with the values of the allocated four bits. Each signal point indicates the amplitude and phase of an optical signal.

When the bias voltage VP is appropriately controlled, the I-Q phase difference is 90 degrees, and as depicted in FIG. 3A, signal points are distributed symmetrically with respect to each of an I axis and a Q axis. However, when the bias voltage VP is not appropriately controlled, the positions of signal points on a phase plane are shifted, as depicted in FIG. 3B. In this example, θ is an error provided by the fixed phase shifter 16 with respect to "90 degrees," and φ indicates a phase added by the phase adder 17. Ideally, "θ+φ" is zero. When, as depicted in FIG. 3B, the amplitude and/or phase of a signal point to which a transmission symbol is mapped deviate(s) from a target value, an error will occur at a reception node with an increased probability.

Figure 4:
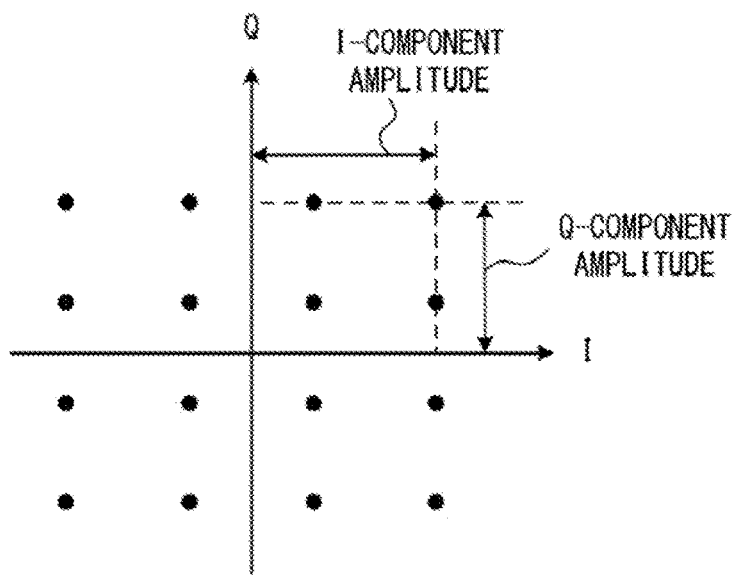
FIG. 4 illustrates an example of an effect caused by an I-Q gain deviation.

FIG. 4 illustrates an example of an effect caused by an I-Q gain deviation. The gain deviation corresponds to a ratio between the amplitude of a drive signal supplied to the I-component modulator 14 (i.e., data signal Re) and the amplitude of a drive signal supplied to the Q-component modulator 15 (i.e., data signal Im)). In the example depicted in FIG. 4, the amplitude of the data signal Re is larger than that of the data signal Im. In this case, the distribution of the 16 signal points forms a rectangle, not a square. When, as depicted in FIG. 4, the amplitude and/or phase of a signal point to which a transmission symbol is mapped deviates from a target value, an error will occur at a reception node with an increased probability.

Figure 5:
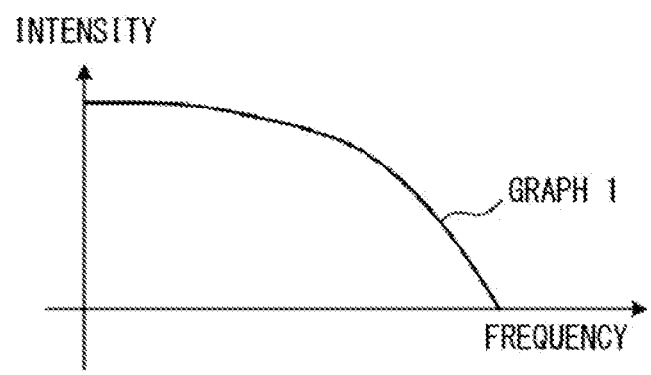
FIG. 5 illustrates an example of an effect caused by frequency characteristics.
Figure 5:
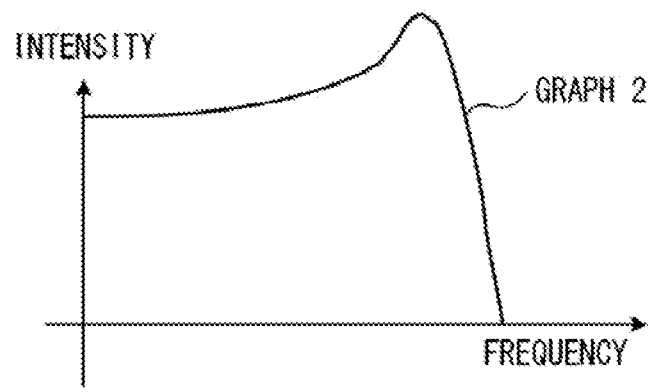
Figure 5:
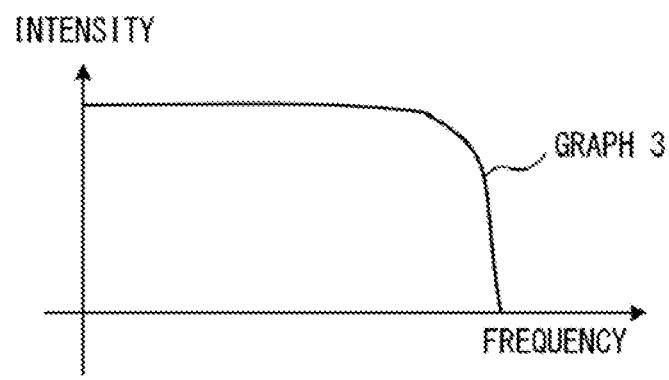

FIG. 5 illustrates an example of an effect caused by frequency characteristics. In this example, as indicated by a graph 3, required characteristics are such that the intensity of a signal is flat in a specified frequency range. In this case, when the frequency characteristics of transfer functions (the analog output circuits of the DACs, the drivers, and the modulators) do not satisfy the requirement, a symbol waveform will be corrected by the waveform shapers 5a and 5b. Assume, for example, that the intensity of a signal decreases in a high frequency range, as indicated by a graph 1. In this case, the waveform shapers 5a and 5b provide a function for compensating for frequency characteristics (graph 2). The required frequency characteristics are implemented by processing a data signal by using this function.

FIG. 6 illustrates an example of an effect caused by an I-Q skew. The I-Q skew indicates the difference between a timing at which a data signal Re is supplied to the I-component modulator 14 and a timing at which a data signal Im is supplied to the Q-component modulator 15. In the example depicted in FIG. 6, the data signal Im is later than the data signal Re. In this case, an optical signal Q generated by the Q-component modulator 15 will be delayed with respect to an optical signal I generated by the I-component modulator 14. When the I-Q skew is large, the substantial symbol time will be short, as depicted in FIG. 6.

As described above, when the state of the optical transmitter (in particular, the modulator 1) is not appropriately controlled, the quality of an optical signal may be reduced. Hence, the optical transmitter preferably has a function for monitoring and controlling the state this optical transmitter (in particular, the state of the modulator 1).

As an example, the optical transmitter may include a coherent receiver. In this case, the coherent receiver receives an optical signal output from the optical transmitter, so as to detect electric field information of the optical signal. A controller controls the state of the optical transmitter according to the detected electric field information. However, power consumption of the coherent receiver will be large, and a laser light source to be used for coherent detection will be expensive. Meanwhile, an optical transceiver module that includes the optical transmitter and an optical receiver can control the state of the optical transmitter by using a coherent receiver in the optical receiver. However, in this case, the state of the optical transmitter cannot be controlled during an in-service period. Monitoring an output optical signal of an optical transmitter by using a coherent receiver is described in, for example, the above-described document Ginni Khanna et al.

A scheme of superimposing a test signal (or dithering signal) onto an optical signal is considered to be another example. In this case, a test signal is detected from an output optical signal, and the state of an optical modulator is monitored according to the detected test signal. In this scheme, a circuit that consumes large power, such as a coherent receiver, does not need to be provided. However, in this scheme, since a test signal is superimposed onto an optical signal, the quality of the optical signal may be reduced. This problem may be solved by adding a test signal in a different time slot from a data signal. However, the efficiency of data transmission will decrease in this case. Note that schemes of using a test signal or a dithering signal are described in, for example, the following documents. C. R. S. Fludger et al. *Low Cost Transmitter Self-Calibration of Time Delay and Frequency Response for High Baud-Rate QAM Transceivers*, OFC2017, Th1D.3.
Y. Fan et al. *Overall Frequency Response Measurement of DSP-based Optical Transmitter using Built-in Monitor Photodiode*, ECOC2016.

Embodiments of the present invention solve or alleviate such problems. In particular, in embodiments of the invention, power consumption of the function of controlling the state of the optical transmitter is reduced. Furthermore, embodiments of the invention allow the state of the optical transmitter to be monitored and controlled during an in-service period.

First Embodiment

Figure 7:
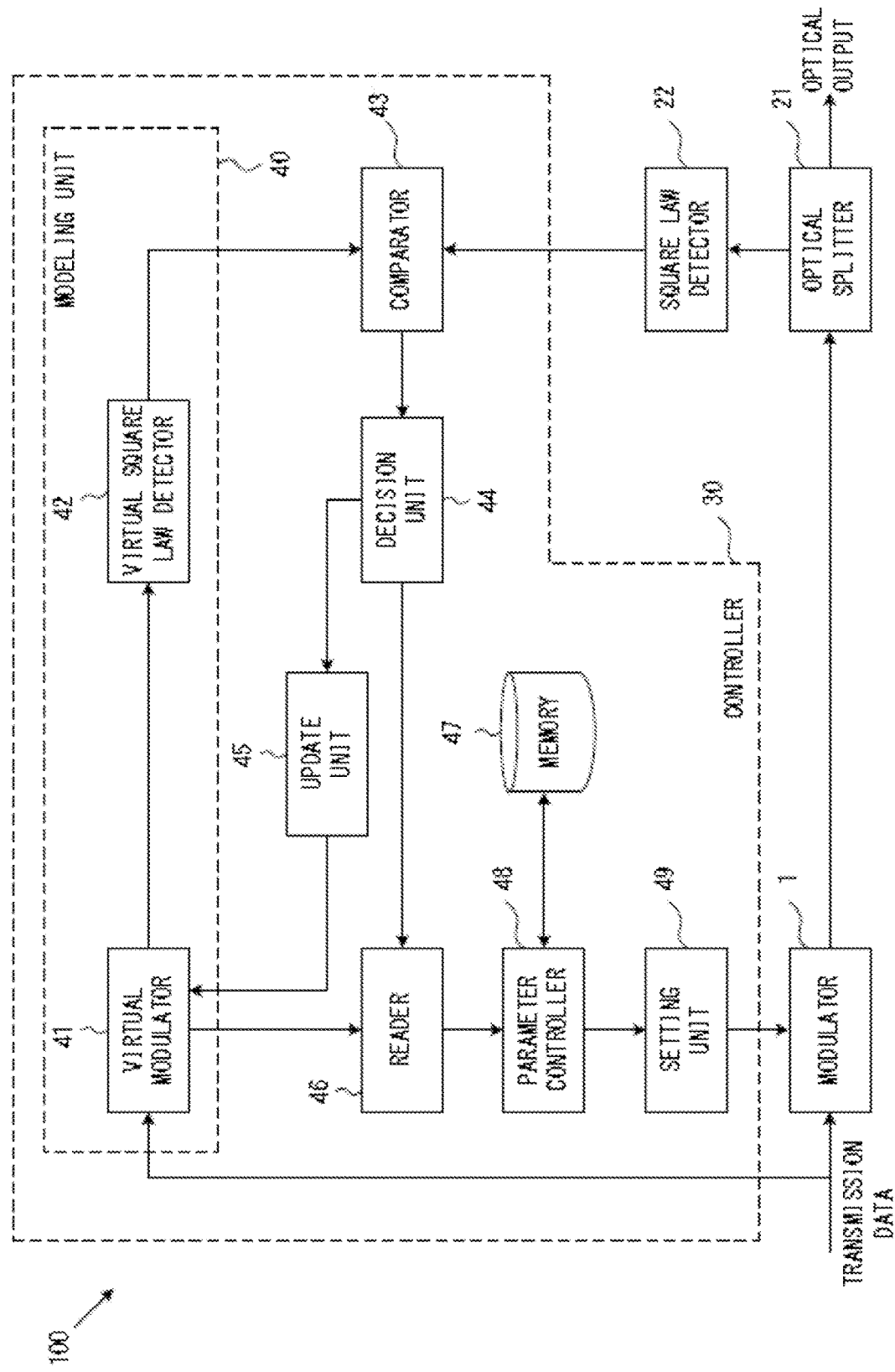
FIG. 7 illustrates an example of an optical transmitter in accordance with a first embodiment of the present invention.

FIG. 7 illustrates an example of an optical transmitter in accordance with a first embodiment of the present invention. An optical transmitter 100 in accordance with a first embodiment includes a modulator 1, an optical splitter 21, a square law detector 22, and a controller 30. The optical transmitter 100 may include other circuits or functions that are not depicted in FIG. 7. The modulator 1 illustrated in FIG. 7 corresponds to the modulator 1 depicted in FIG. 1. Thus, the modulator 1 generates an optical signal indicating transmission data.

The optical splitter 21 splits an output optical signal of the modulator 1 and guides the split portion of the optical signal to the square law detector 22. For example, the optical splitter 21 may be implemented by an optical coupler.

The square law detector 22 detects an optical signal guided from the optical splitter 21. For example, the square law detector 22 may include a photodetector and an analog-to-digital converter (ADC). In this case, the photodetector generates an electric signal indicating the intensity of the optical signal. The ADC converts an output signal of the photodetector into a digital signal. Thus, the square law detector 22 outputs intensity data indicating the intensity of an optical signal generated by the modulator 1. The square law detector 22 in this example outputs, for each transmission symbol, intensity data indicating the intensity of an optical signal, but the invention is not particularly limited to this.

The controller 30 includes a modeling unit 40, a comparator 43, a decision unit 44, an update unit 45, a reader 46, a memory 47, a parameter controller 48, and a setting unit 49. Note that the controller 30 may have other functions that are not depicted in FIG. 7. In addition, the controller 30 may be implemented by a processor system that includes a processor and a memory. In this case, the processor provides the functions of the controller 30 by executing a program stored in the memory. However, some of the functions of the controller 30 may be implemented by a hardware circuit.

The modeling unit 40 includes a virtual modulator 41 and a virtual square law detector 42. The modeling unit 40 calculates an output signal of the modulator 1 and an output signal of the square law detector 22 by using a mathematical model. In particular, the modeling unit 40 virtually implements the modulator 1 and the square law detector 22.

According to transmission data, the virtual modulator (electric field calculator) 41 calculates the electric field of an optical signal generated by the modulator 1. A signal indicating the calculated electric field may be referred to as an "electric-field-information signal." According to the electric-field-information signal generated by the virtual modulator 41, the virtual square law detector (intensity calculator) 42 calculates intensity data indicating the intensity of the optical signal generated by the modulator 1.

The virtual modulator 41 calculates an electric field I of an optical signal I output from the I-component modulator 14 when a data signal x is supplied to the modulator 1. The electric field I is expressed by formula 1.

$$I = g_I(\Delta Re + VI, t) * WI(t) * Re\{x(t + \Delta tI + \Delta \tau I)\} \tag{1}$$

$g_T$ indicates a transfer function of the analog output circuit of the DAC 11a, the driver 12a, and the I-component modulator 14. The transfer function $g_I$ is created in advance according to the characteristics of the DAC 11a, the characteristics of the driver 12a, the characteristics of the I-component modulator 14, and the like. Δ Re indicates a deviation of a bias voltage of the I-component modulator 14. t indicates a time. WI indicates a characteristic function of the symbol waveform of an I component. For example, the characteristic function WI may indicate the amplitude and frequency characteristics of a drive signal of the optical modulator (in this example, a data signal Re). ΔtI indicates a propagation time for an electric signal for a path from the output of the delay adjuster 4a to the I-component modulator 14. For example, ΔtI may be measured in advance. ΔττI indicates a delay time caused by the delay adjuster 4a.

The virtual modulator 41 also calculates an electric field Q of an optical signal Q output from the Q-component modulator 15 when a data signal x is supplied to the modulator 1. The electric field Q is expressed by formula 2.

$$Q = g_Q(\Delta \text{Im} + VQ, t, \theta + \varphi(VP)) * WQ(t) * \text{Im}\{x(t + \Delta tQ + \Delta \tau Q)\} \quad (2)$$

$g_Q$ indicates a transfer function of the analog output circuit of the DAC 11b, the driver 12b, and the Q-component modulator 15. The transfer function $g_Q$ is created in advance according to the characteristics of the DAC 11b, the characteristics of the driver 12b, the characteristics of the Q-component modulator 15, and the like. Δ Im indicates a deviation of a bias voltage of the Q-component modulator 15. θ indicates a phase offset added by the fixed phase shifter 16. φ indicates a phase added by the phase adder 17. φ is controlled by the bias voltage VP. WQ indicates a characteristic function of the symbol waveform of a Q component. For example, the characteristic function WQ may indicate the amplitude and frequency characteristics of a drive signal of the optical modulator (in this example, a data signal Im). ΔtQ indicates a propagation time for an electric signal for a path from the output of the delay adjuster 4b to the Q-component modulator 15. For example, ΔtQ may be measured in advance. ΔτQ indicates a delay time caused by the delay adjuster 4b.

The virtual square law detector 42 performs square processing on a complex number calculated by the virtual modulator 41. As a result, intensity data indicating the intensity of an optical signal generated by the modulator 1 is generated. In particular, intensity data P is calculated in accordance with formula 3.

$$P = I^2 + Q^2 \quad (3)$$

Descriptions are given in the following by referring to FIG. 7 again. The comparator 43 compares intensity data generated by the square law detector 22 with intensity data generated by the virtual square law detector 42. The intensity data generated by the square law detector 22 (may hereinafter be referred to as "first intensity data") indicates the intensity of an optical signal actually generated by the modulator 1. The intensity data generated by the virtual square law detector 42 (may hereinafter be referred to as "second intensity data") indicates the intensity of an optical signal calculated by the modeling unit 40 using the mathematical model. It is preferable that the first intensity data and the second intensity data be appropriately normalized.

The decision unit 44 decides whether the difference between the first intensity data and the second intensity data is less than a specified threshold. The decision result is reported to the update unit 45 or the reader 46. The threshold is preferably a sufficiently small value. In this case, the decision unit 44 decides whether the difference between the first intensity data and the second intensity data can be deemed as substantially zero.

When the difference between the first intensity data and the second intensity data is larger than or equal to the threshold, the update unit 45 updates parameters pertaining to the state of the modulator 1 such that the difference is reduced. The "parameters pertaining to the state of the modulator 1" may include the following parameters used by the virtual modulator 41. However, the "parameters pertaining to the state of the modulator 1" are not limited to these.
(1) Δ Re: The amount of deviation of a bias voltage applied to the I-component modulator 14

(2) Δ Im: The amount of deviation of a bias voltage applied to the Q-component modulator 15
(3) φ: A phase amount by which an error of I-Q phase difference is compensated for
(4) ΔτI: A delay amount for the data signal Re
(5) ΔτQ: A delay amount for the data signal Im
(6) WI: A gain of a drive signal of the I-component modulator 14
(7) WQ: A gain of a drive signal of the Q-component modulator 15

The update unit 45 updates the parameters until the difference between the first intensity data and the second intensity data falls below the threshold. In this case, the update unit 45 may update the parameters in any order. For example, the update unit 45 may detect a value of Δ Re at which the difference is minimized, with the parameters other than Δ Re fixed. Then, the update unit 45 may detect a value of Δ Im at which the difference is minimized, with the parameters other than Δ Im fixed. Similarly, the update unit 45 may sequentially select and update a parameter until the difference falls below the threshold.

Alternatively, a transfer function H for the modulator 1 may be estimated using a phase retrieval algorithm. Assume, for example, that an output signal of the square law detector 22 is y for an input signal x. In this case, the output signal y is expressed by formula 4.

$$y = |Hx|^2 \quad (4)$$

x is a known data signal. y is obtained by monitoring output of the square law detector 22. Hence, the transfer function H can be calculated. A phase retrieval algorithm is described in, for example, the following document.

J. Liang et al. *Phase Retrieval via the Alternating Direction Method of Multipliers*, IEEE Signal Process. Lett. 25(1), 5-9 (2018)

When the difference between the first intensity data and the second intensity data falls below the threshold, the decision unit 44 decides that the virtual modulator 41 indicates the state of the modulator 1. That is, it is decided that the parameters updated by the virtual modulator 41 indicate the state of the modulator 1. Then, the decision unit 44 gives a read instruction to the reader 46.

Upon receipt of the read instruction from the decision unit 44, the reader 46 reads latest parameters set for the virtual modulator 41. In particular, Δ Re, Δ Im, φ, ΔτI, ΔτQ, WI, and WQ updated by the update unit 45 are read.

The parameter controller 48 determines parameters to be set for the modulator 1 according to the parameters read by the reader 46 and information stored in the memory 47. In this regard, the memory 47 stores information indicating the current state of the modulator 1. For example, the memory 47 may store the following information.
(1) A bias voltage applied to the I-component modulator 14
(2) A bias voltage applied to the Q-component modulator 15
(3) A bias voltage applied to the phase adder 17
(4) A delay amount caused by the delay adjuster 4a for the data signal Re
(5) A delay amount caused by the delay adjuster 4b for the data signal Im
(6) A gain made for the data signal Re by the waveform shaper 5a
(7) A gain made for the data signal Im by the waveform shaper 5b The setting unit 49 sets, for the modulator 1, the parameters determined by the parameter controller 48. Thus, the parameter controller 48 and the setting unit 49 control the state of the modulator 1 according to the parameters updated by the modeling unit 40.

For example, the state of the modulator 1 in the optical transmitter 100 may change with temperature or aging. In particular, input voltage-optical output characteristics of the I-component modulator 14 and the Q-component modulator 15 may change. The phase difference between the I-component modulator 14 and the Q-component modulator 15 (i.e., I-Q phase difference) may change. A propagation time for a path from the DSP 2 to each of the modulators 14 and a propagation time for a path from the DSP 2 to the Q-component modulator 15 may change. The voltage of drive signals of the I-component modulator 14 and the Q-component modulator 15 may change. If the state of the modulator 1 changes, the quality of an optical signal generated by the modulator 1 will be reduced.

Accordingly, in the optical transmitter 100, the controller 30 monitors the state of the modulator 1 and controls the state of the modulator 1 in accordance with the monitoring result. Here, the controller 30 monitors the state of the modulator 1 by using a detection result provided by the square law detector circuit which consumes small power, without using a circuit that consumes large power, such as a coherent receiver. The following describes operations of the controller 30.

FIGS. 8A-8E illustrate an example of operations of the controller 30. In this example, the modulator 1 is controlled so as to be in an ideal state at a certain time. For example, as depicted in FIG. BA, a signal point P1 may indicate the amplitude and phase of a transmission symbol corresponding to a data signal x(t). In this case, a bias voltage VI applied to the I-component modulator 14 in the modulator 1 is controlled so as to be "1.0." With regard to the descriptions pertaining to FIGS. 8A-SE, descriptions of the other parameters of the modulator 1 are omitted for simplicity.

The virtual modulator 41 indicates the state of the modulator 1. Thus, the virtual modulator 41 controls the bias voltage of the I-component modulator 14 (VI in formula 1) such that the bias voltage is "1.0." Δ Re, which indicates a "deviation" of the bias voltage of the I-component modulator 14, is zero. Note that descriptions of the other parameters set for the virtual modulator 41 are omitted for simplicity.

Figure 8A:
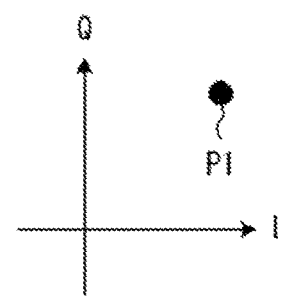
FIGS. 8A-8E illustrate an example of operations of a controller.

An output signal of the square law detector 22 indicates the intensity of an optical signal generated by the modulator 1. Thus, in the example depicted in FIG. 8A, first intensity data generated by the square law detector 22 indicates the distance between the origin of a phase plane and the signal point P1. Meanwhile, according to formulae 1-3, the modeling unit 40 generates second intensity data indicating the intensity of the optical signal generated by the modulator 1. In FIG. 8A, the difference between the first intensity data and the second intensity data is substantially zero. Thus, the virtual modulator 41 accurately indicates the state of the modulator 1.

Figure 8B:
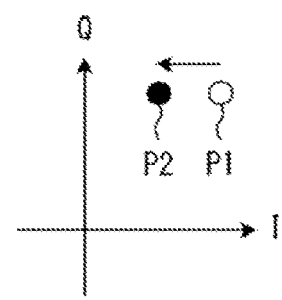

Assume that afterward, the state of the modulator 1 changes due to, for example, a change in the temperature of the area around the optical transmitter 1. For example, as depicted in FIG. 8B, a signal point P2 may indicate the amplitude and phase of the transmission symbol corresponding to the data signal x(t). That is, the amplitude and phase of the transmission symbol have changed due to a change in the state of the modulator 1. If the amplitude and/or phase of a transmission symbol are/is shifted from an ideal state, the quality of an optical signal generated by the modulator 1 will be reduced.

In the state depicted in FIG. 8B, the controller 30 compares first intensity data generated by the square law detector 22 with second intensity data output from the modeling unit 40. In this case, the first intensity data indicates the distance between the origin of the phase plane and the signal point P2. Meanwhile, before the parameter of the virtual modulator 41 is updated, the second intensity data indicates the distance between the origin of the phase plane and the signal point P1. Thus, there is an error between the first intensity data and the second intensity data.

Figure 8C:
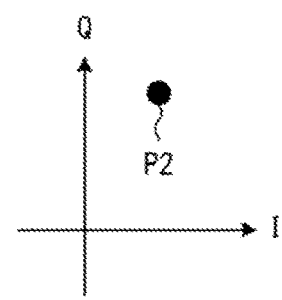

The controller 30 updates the parameter of the virtual modulator 41 so as to reduce the difference between the first intensity data and the second intensity data. In order to simplify the description, this example is based on the assumption that only the parameter pertaining to the bias voltage of the I-component modulator 14 is updated. Thus, the parameter Δ Re indicating the amount of deviation of the bias voltage of the I-component modulator 14 is updated. Then, the parameter Δ Re is, as depicted in FIG. 8C, updated from "zero" to "0.2" in formulae (1)-(3), so the difference between the first intensity data and the second intensity data becomes substantially zero.

When the difference between the first intensity data and the second intensity data is substantially zero, it is inferred that the virtual modulator 41 accurately indicates the state of the modulator 1. In this regard, Δ Re is updated from "zero" to "0.2" in the process of shifting from the state depicted in FIG. 8A to the state depicted in FIG. 8C. Accordingly, the controller 30 infers that a state change corresponding to "Δ Re=0.2" has occurred in the modulator 1 due to a temperature change.

According to the parameter of the virtual modulator 41, the controller 30 determines a parameter for controlling the modulator 1 so as to return the modulator 1 to an ideal state. The amount of change in the parameter of the virtual modulator 41 indicates the amount of change in the state of the modulator 1. Thus, it is considered that changing the state of the modulator 1 so as to compensate for the amount of change in the parameter of the virtual modulator 41 will return the modulator 1 to an ideal state.

Figure 8D:
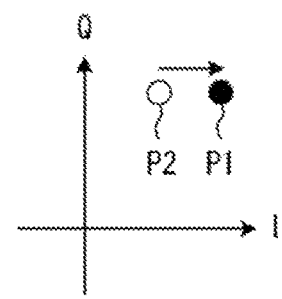
Figure 8E:
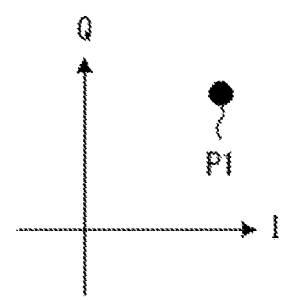

Accordingly, the parameter controller 48 decreases the bias voltage of the I-component modulator 14 by "0.2," as depicted in FIG. 8D. In particular, the bias voltage of the I-component modulator 14 is changed from "1" to "0.8." The setting unit 49 controls the modulator 1 according to the determination made by the parameter controller 48. Thus, the bias voltage of the I-component modulator 14 is controlled so as to be "0.8." As a result, the transmission symbol of the data signal x(t) is positioned at the signal point P1.

Then, the parameter of the virtual modulator 41 is updated so as to indicate the state of the modulator 1. In this example, the bias voltage of the I-component modulator 14 of the modulator 1 is updated from "1" to "0.8," so the bias voltage VI used in formulae 1-3 by the virtual modulator 41 is also updated from "1" to "0.8," as depicted in FIG. BE. Meanwhile, the "deviation" of the bias voltage of the I-component modulator 14 of the modulator 1 has been canceled out, so the parameter Δ Re used in formulae 1-3 is updated to "zero."

Although only one parameter is updated in the example depicted in FIGS. 8A-8E, a plurality of parameters will actually be updated for the virtual modulator 41. The modulator 1 is controlled in accordance with the update of each parameter.

When, for example, the characteristics of the Mach-Zehnder modulators (14, 15) forming the IQ modulator 13 change, the extinction ratio of an output optical signal will deteriorate, as depicted in FIG. 2. In this case, the operation point of the Mach-Zehnder modulators deviates from an optimum point, so it is considered that at least the parameter(s) Δ Re and/or Δ Im are/is updated by the update unit 45 in the process of reducing the difference in optical intensity. Thus, the parameters of the modulator 1 are determined using the procedure described above by referring to FIGS. BA-8E. In particular, the bias voltage of the I-component modulator 14 is adjusted so as to satisfy formula (5). A similar adjustment is also made for the Q-component modulator 15.

$$V = \Delta Re + VI \quad (5)$$

When the phase difference between the I-component modulator 14 and the Q-component modulator 15 (i.e., I-Q phase difference) changes, the symmetric property of the constellation will deteriorate, as depicted in FIG. 3B. In this case, a change in the I-Q phase difference is expressed by θ in formula 2. Meanwhile, in the process of reducing the difference in optical intensity, the parameter φ is considered to be updated by the update unit 45 so as to compensate for a change in θ. As an example, a bias voltage applied to the phase adder 17 may be adjusted so as to satisfy formula 6. Note that the parameter φ is a function of the bias voltage VP.

$$\theta + \phi(VP) = 0 \quad (6)$$

When the amplitude of a drive signal of the I-component modulator 14 does not match the amplitude of a drive signal of the Q-component modulator 15, distances between signal points for I components are different from distances between signal points for Q components, as depicted in FIG. 4. In this regard, when the amplitude of the drive signal of the I-component modulator 14 changes, the parameter WI is updated in formula 1 in the process of reducing the difference in optical intensity, so as to compensate for the change in the amplitude. When the amplitude of the drive signal of the Q-component modulator 15 changes, the parameter WQ is updated in formula 2 in the process of reducing the difference in optical intensity, so as to compensate for the change in the amplitude.

Afterward, gains made by the waveform shapers 5a and 5b of the modulator 1 are adjusted according to the parameters WI and WQ updated by the modeling unit 40. For example, when the ratio between the I-component amplitude and the Q-component amplitude depicted in FIG. 4 can be detected or estimated, the gains made by the waveform shapers 5a and 5b may be adjusted such that the ratio becomes "1:1."

When the propagation time for a path between the DSP 2 and the I-component modulator 14 does not match the propagation time for a path between the DSP 2 and the Q-component modulator 15, an I-Q skew will occur as depicted in FIG. 6, and the substantial symbol time will be shortened. In this regard, a change in the propagation time for a path between the DSP 2 and the I-component modulator 14 is expressed by ΔtI in formula 1. In the process of reducing the difference in optical intensity, the parameter ΔτI is considered to be updated by the update unit 45 so as to compensate for the change in ΔtI. A change in the propagation time for a path between the DSP 2 and the Q-component modulator 15 is expressed by ΔτQ in formula 2. In the process of reducing the difference in optical intensity, the parameter ΔτQ is considered to be updated by the update unit 45 so as to compensate for the change in ΔτQ.

Afterward, the delay times caused by the delay adjusters 4a and 4b of the modulator 1 are adjusted according to the parameters ΔτI and ΔτQ updated by the modeling unit 40. For example, the delay amount of at least either of the delay adjusters 4a and 4b may be adjusted so as to satisfy the relationship of formula 7. As a result, the I-Q skew becomes zero.

$$\Delta tI + \Delta \tau I = \Delta tQ + \Delta \tau Q \quad (7)$$

Figure 9:
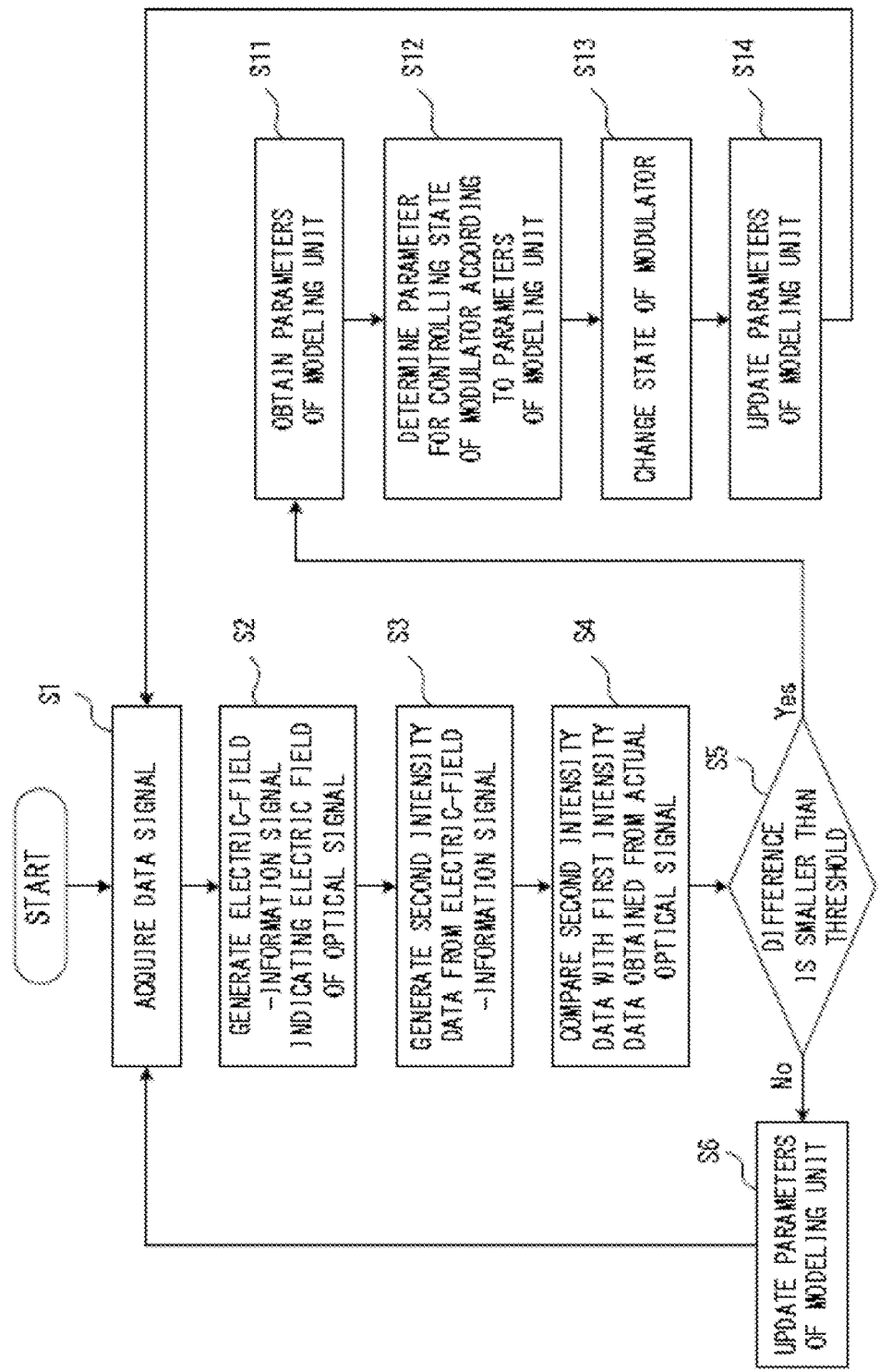
FIG. 9 is a flowchart illustrating an example of operations of a controller.

FIG. 9 is a flowchart illustrating an example of operations of the controller 30. Note that the same data signal is input to the controller 30 and the modulator 1.

In S1, the controller 30 acquires a data signal. In this example, the controller 30 acquires a data signal for each symbol.

In S2, the virtual modulator 41 calculates, according to the input data signal, an electric field indicating an optical signal generated by the modulator 1. The electric field is calculated in accordance with formulae 1-2. Then, the virtual modulator 41 outputs an electric-field-information signal indicating the calculated electric field.

In S3, the virtual square law detector 42 calculates the intensity of an output optical signal of the modulator 1 (i.e., second intensity data) according to the electric-field-information signal generated by the virtual modulator 41. The second intensity data is calculated in accordance with formula 3. In this case, the square law detector 22 detects the actual intensity of the optical signal (i.e., first intensity data).

In S4-S5, the comparator 43 compares the first intensity data with the second intensity data. In particular, the intensity of the actual intensity of the optical signal is compared with the intensity calculated by the modeling unit 40. When the difference between the first intensity data and the second intensity data is larger than or equal to a specified threshold, the process of the controller 30 shifts to S6.

In S6, the update unit 45 updates the parameters of the virtual modulator 41 so as to reduce the difference between the first intensity data and the second intensity data. In particular, the parameters used in formulae 1-2 are updated. In this case, the update unit 45 may update only one of the plurality of parameters or may concurrently update two or more of the parameters. Subsequently, the process of the controller 30 returns to S1. Thus, the controller 30 performs the processes of S1-S6 for a next data signal.

The processes of S1-S6 are repeatedly performed until the difference between first intensity data and second intensity data falls below the threshold. When the difference falls below the threshold, the process of the controller 30 shifts to S11. When the difference between first intensity data and second intensity data is smaller than the threshold, the virtual modulator 41 precisely indicates the state of the modulator 1. Thus, when the difference is smaller than the threshold, formulae 1-2 precisely indicate the electric field of an output signal of the modulator 1.

In S11, the reader 46 obtains the parameters of the modeling unit 40. That is, the updated parameters are obtained.

In S12, the parameter controller 48 determines, according to the parameters of the modeling unit 40, parameters for controlling the state of the modulator 1. Note that an example of the procedure for determining a parameter for controlling the state of the modulator 1 has been described above by referring to FIGS. 8A-8E. For example, the current control state of the modulator 1 (the bias voltages of the modulators 14 and 15, the bias voltage of the phase adder 17, delay amounts caused by the delay adjusters 4a and 4b, and gains made by the waveform shapers 5a and 5b) may be stored in the memory 47. In this case, according to the current control state of the modulator 1 and the amount of change in the parameters of the modeling unit 40, the parameter controller 48 may determine parameters for controlling the state of the modulator 1.

In S13, the setting unit 49 sets, for the modulator 1, the parameters determined by the parameter controller 48. That is, the parameter controller 48 and the setting unit 49 control the state of the modulator 1. Then, the parameters set for the modulator 1 are stored in the memory 47. That is, information indicating the current control state of the modulator 1 is stored in the memory 47.

In S14, the controller 30 updates the parameters of the modeling unit 40 such that the parameters match the state of the modulator 1. For example, in formula 1, VI is updated to the bias voltage value of the I-component modulator 14. In formula 2, VQ is updated to the bias voltage value of the Q-component modulator 15, and VP is updated to the bias voltage value of the phase adder 17. $\Delta$ Re, $\Delta$ Im, and $\phi$ are initialized.

Figure 10:
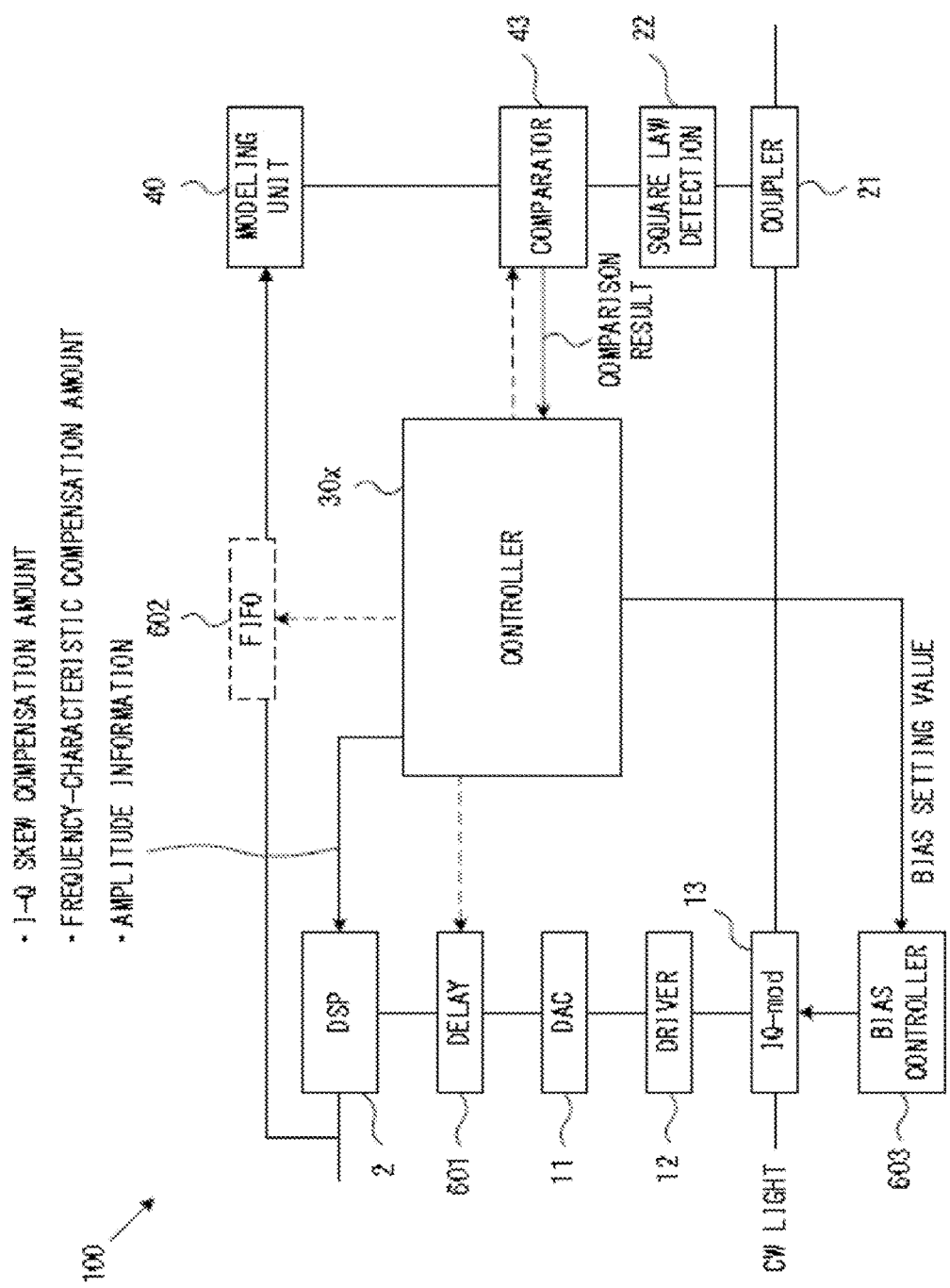
FIG. 10 illustrates a configuration example of an optical transmitter.

FIG. 10 illustrates a configuration example of the optical transmitter 100. A controller 30x corresponds to the decision unit 44, the update unit 45, the reader 46, the memory 47, the parameter controller 48, and the setting unit 49 depicted in FIG. 7.

A delay element 601 delays an output signal of the DSP 2. A FIFO 602 temporarily stores a data signal to be supplied to the modeling unit 40. The controller 30x controls the delay element 601, the FIFO 602, and the comparator 43 such that the comparator 43 compares intensity data of the same symbol. Note that dashed arrows indicated in FIG. 10 represent signals for controlling synchronization.

The controller 30x supplies bias setting values to a bias controller 603 according to a comparison result provided by the comparator 43. The bias setting values indicate a bias voltage for controlling the I-component modulator 14, a bias voltage for controlling the Q-component modulator 15, and a bias voltage for the phase adder 17. The controller 30x may have a function for obtaining the current values of the bias controller 603.

The controller 30x controls, according to a comparison result provided by the comparator 43, signal processing performed by the DSP 2. In particular, the controller 30x supplies the DSP 2 with an I-Q compensation amount, a frequency-characteristic compensation amount, and amplitude information. The I-Q compensation amount indicates delay amounts to be caused by the delay adjusters 4a and 4b. The frequency-characteristic compensation amount and the amplitude information indicate signal processing to be performed by the waveform shapers 5a and 5b. The controller 30x may have a function for obtaining the current value of a parameter set for the DSP 2.

Figure 11:
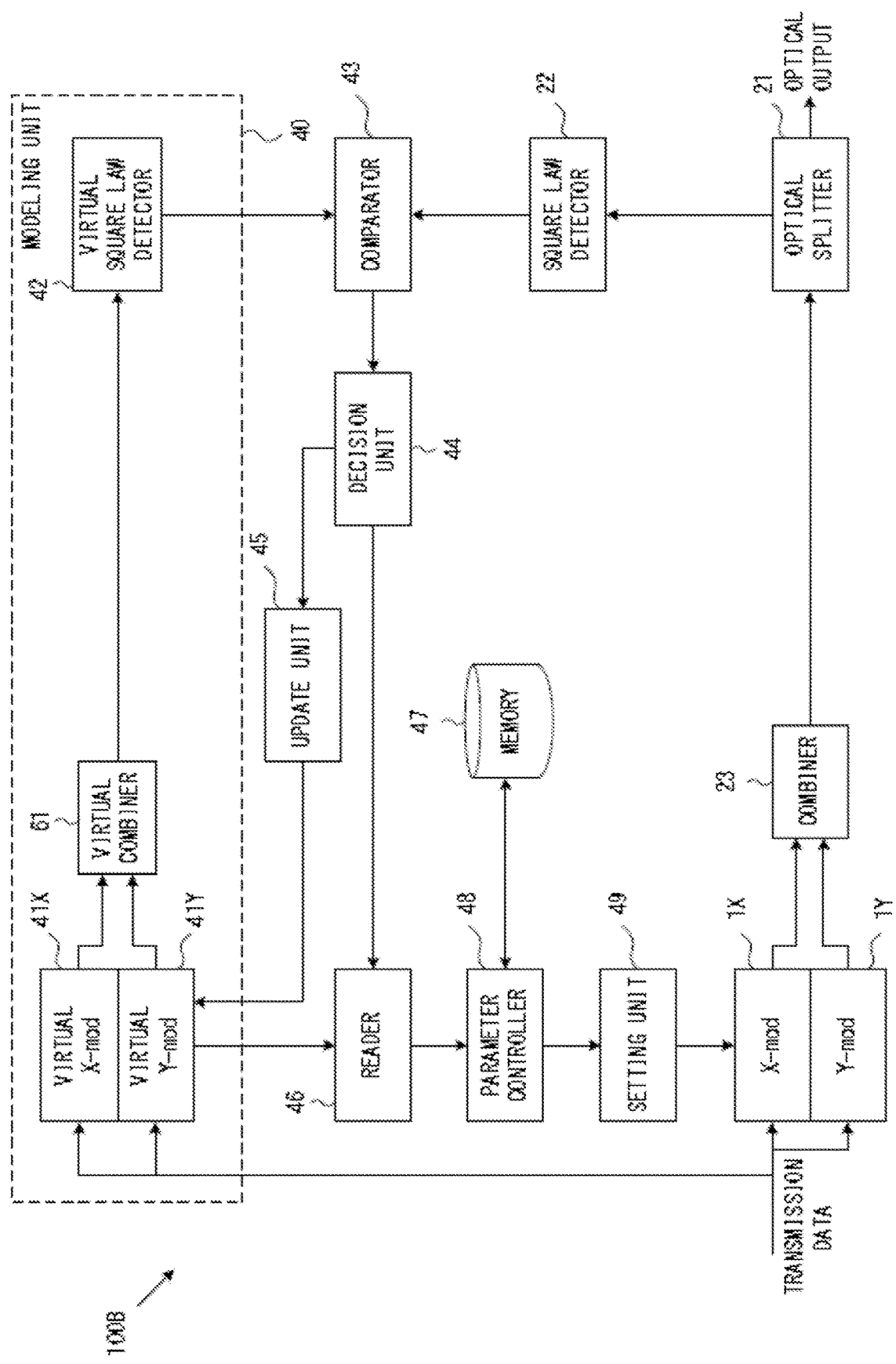
FIG. 11 illustrates a variation of an optical transmitter in accordance with a first embodiment.

FIG. 11 illustrates a variation of the optical transmitter in accordance with the first embodiment. An optical transmitter 100B depicted in FIG. 11 transmits a polarization multiplexed optical signal. Accordingly, the optical transmitter 100B includes a X-polarization modulator 1X, a Y-polarization modulator 1Y, and a combiner 23, instead of the modulator 1 depicted in FIG. 7 (or as the modulator 1 depicted in FIG. 7). The configurations of the X-polarization modulator 1X and the Y-polarization modulator 1Y are each substantially the same as that of the modulator 1 depicted in FIG. 1. The combiner 23 combines an output optical signal of the X-polarization modulator 1X and an output optical signal of the Y-polarization modulator 1Y so as to generate a polarization multiplexed optical signal. For example, the combiner 23 may be implemented by a polarization beam combiner.

The modeling unit 40 includes a virtual X-polarization modulator 41X, a virtual Y-polarization modulator 41Y, and a virtual combiner 61 in association with the X-polarization modulator 1X, the Y-polarization modulator 1Y, and the combiner 23. The virtual X-polarization modulator 41X and the virtual Y-polarization modulator 41Y each perform similar calculations to the virtual modulator 41. The virtual combiner 61 sums a calculation result provided by the virtual X-polarization modulator 41X and a calculation result provided by the virtual Y-polarization modulator 41Y. The virtual square law detector 42 raises an output signal of the virtual combiner 61 to the second power.

The process of updating parameters in the optical transmitter 100 depicted in FIG. 7 and that in the optical transmitter 100B depicted in FIG. 11 are substantially the same. Thus, the parameters of the modeling unit 40 are updated such that the difference between first intensity data detected by the square law detector 22 and second intensity data calculated by the modeling unit 40 falls below a threshold. Then, the X-polarization modulator 1X and the Y-polarization modulator 1Y are controlled according to the updated parameters.

Figure 12:
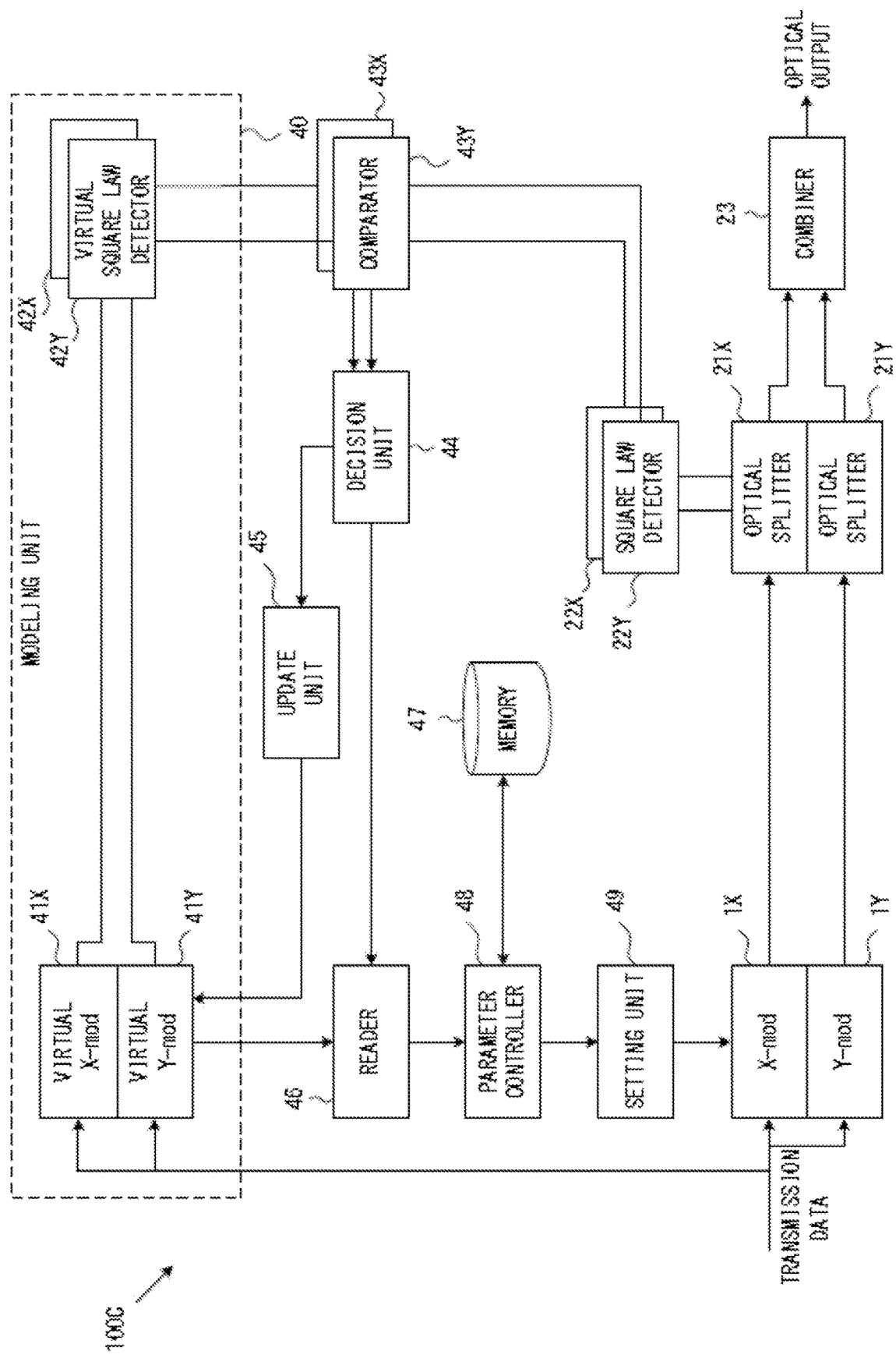
FIG. 12 illustrates another variation of an optical transmitter in accordance with a first embodiment.

FIG. 12 illustrates another variation of the optical transmitter in accordance with the first embodiment. In the optical transmitter 100B depicted in FIG. 11, the parameters of the modeling unit 40 are updated using the intensity of a polarization multiplexed optical signal. By contrast, in an optical transmitter 100C depicted in FIG. 12, the parameters of the modeling unit 40 are updated for each polarization by using the intensity of the polarization.

An optical signal X generated by the X-polarization modulator 1X and an optical signal Y generated by the Y-polarization modulator 1Y are respectively split by the optical splitters 21X and 21Y before being combined. The square law detectors 22X and 22Y respectively detect the intensity of the optical signal X and the intensity of the optical signal Y.

In the modeling unit 40, a calculation result provided by the virtual X-polarization modulator 41X and a calculation result provided by the virtual Y-polarization modulator 41Y are respectively provided to the virtual square law detector 42X and the virtual square law detector 42Y. The virtual square law detectors 42X and 42Y respectively calculate the intensities of X polarization and Y polarization. For X polarization, the comparator 43X compares the detected intensity with the calculated intensity. For Y polarization, the comparator 43Y compares the detected intensity with the calculated intensity.

The process of updating the parameters of the modeling unit 40 in the optical transmitter 100 depicted in FIG. 7 and that in the optical transmitter 100C depicted in FIG. 12 are substantially the same. However, in the optical transmitter 100C, the parameters of the modeling unit 40 are updated for individual polarizations. Then, the X-polarization modulator 1X and the Y-polarization modulator 1Y are controlled for each polarization according to the updated parameters.

As described above, in the optical transmitter 100C depicted in FIG. 12, the modulators (1X, 1Y) are controlled for individual polarizations. Thus, the optical transmitter 100C can improve the quality of an optical signal in comparison with the optical transmitter 100B depicted in FIG. 11. However, the number of square law detectors that include photodetectors and ADCs increases.

Figure 13:
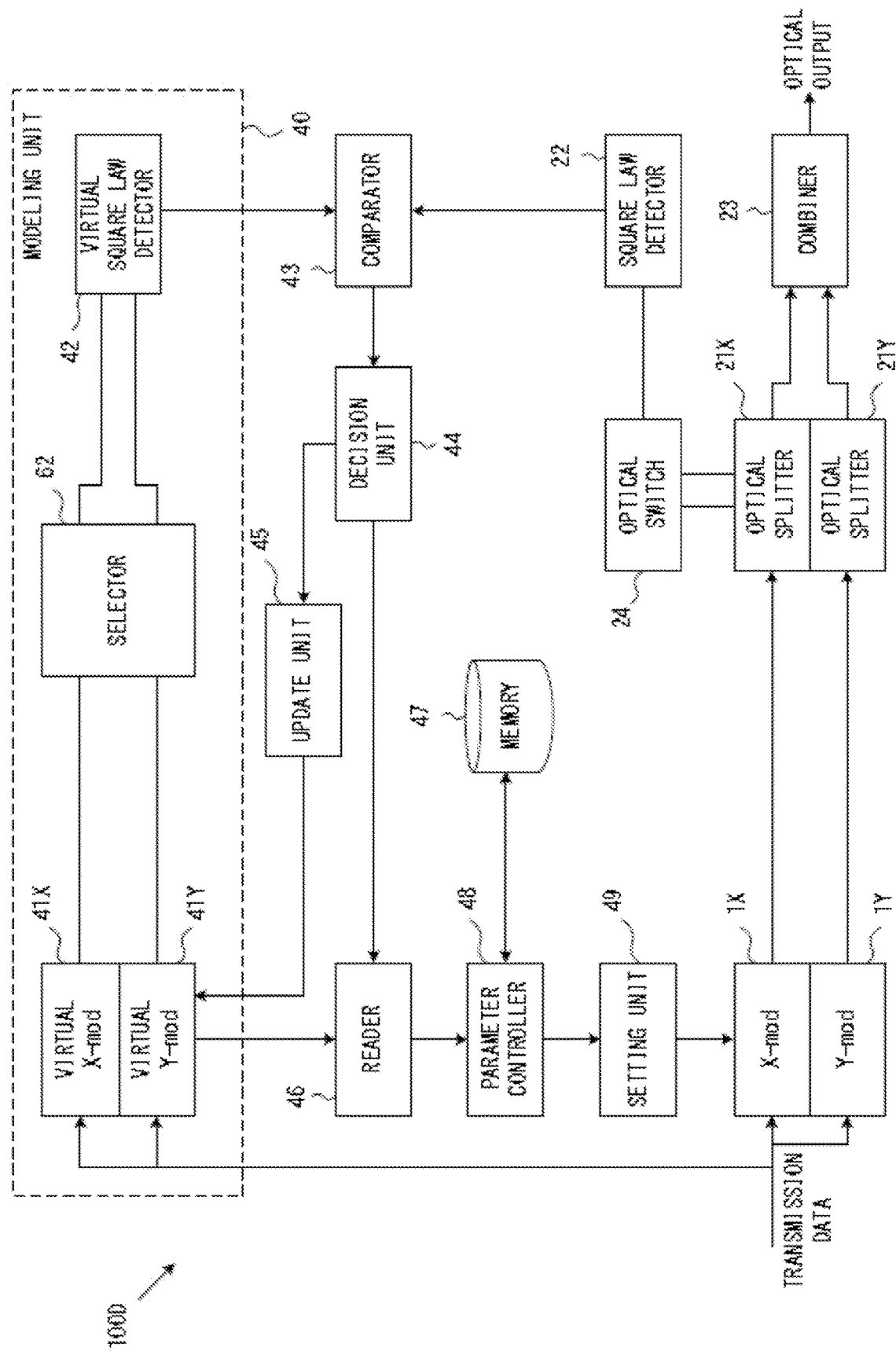
FIG. 13 illustrates still another variation of an optical transmitter in accordance with a first embodiment.

FIG. 13 illustrates still another variation of the optical transmitter in accordance with the first embodiment. The optical transmitter 100C depicted in FIG. 12 includes two square law detectors (22X, 22Y). By contrast, an optical transmitter 100D depicted in FIG. 13 includes an optical switch 24 and one square law detector 22, rather than the two square law detectors implemented in the optical transmitter 100C.

The optical switch 24 selects an optical signal X generated by the X-polarization modulator 1X or an optical signal Y generated by the Y-polarization modulator 1Y and guides the selected optical signal to the square law detector 22. The square law detector 22 detects the intensity of the optical signal selected by the optical switch 24.

The modeling unit 40 includes a selector 62 that selects a calculation result provided by the virtual X-polarization modulator 41X or a calculation result provided by the virtual Y-polarization modulator 41Y. The optical switch 24 and the selector 62 are operated in synchrony with each other. The virtual square law detector 42 performs square processing on the calculation result selected by the selector 62, so as to calculate an intensity.

The process of updating the parameters of the modeling unit 40 in the optical transmitter 100 depicted in FIG. 7 and that in the optical transmitter 100D depicted in FIG. 13 are substantially the same. However, in the optical transmitter 100D, the parameters of the modeling unit 40 are updated for each polarization, and the X-polarization modulator 1X and the Y-polarization modulator 1Y are individually controlled. In addition, in comparison with the optical transmitter 100C depicted in FIG. 12, the number of square law detectors is small, and thus the cost is reduced.

Second Embodiment

For example, the optical transmitter 100 in accordance with the first embodiment may generate intensity data for each symbol. Thus, the square law detector 22 includes a photodetector with a wide bandwidth and an ADC capable of performing high-speed sampling. However, a photodetector with a wide bandwidth and an ADC capable of performing high-speed sampling are expensive. Moreover, an ADC capable of performing high-speed sampling consumes large power.

Figure 14:
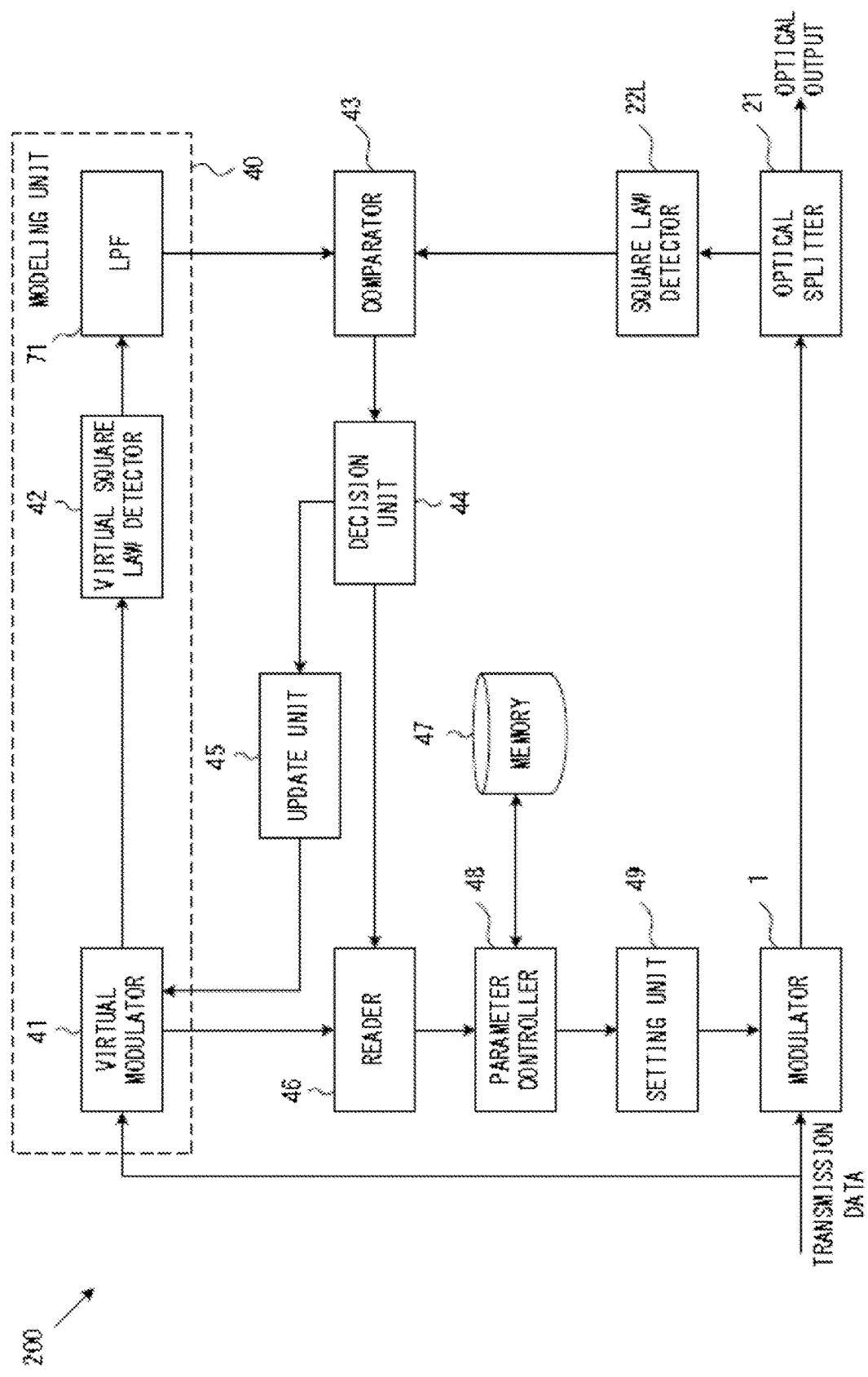
FIG. 14 illustrates an example of an optical transmitter in accordance with a second embodiment of the present invention.

FIG. 14 illustrates an example of an optical transmitter in accordance with a second embodiment of the present invention. Descriptions of elements or functions of an optical transmitter 200 depicted in FIG. 14 that are also seen in the optical transmitter 100 depicted in FIG. 7 are omitted herein.

The optical transmitter 200 in accordance with the second embodiment includes a square law detector 22L, rather than the square law detector 22 depicted in FIG. 7. As with the square law detector 22, the square law detector 22L includes a photodetector and an ADC. However, in comparison with the photodetector in the first embodiment, the bandwidth of the photodetector of the square law detector 22L is narrow. Accordingly, the photodetector of the square law detector 22L has a bandwidth such that the average optical intensity of consecutive N symbols can be detected. The sampling rate of the ADC of the square law detector 22L is lower than that of the ADC in the first embodiment. In particular, the ADC of the square law detector 22L only needs to sample consecutive N symbols. Thus, first intensity data generated in the optical transmitter 200 indicates the average intensity of N symbols. N is not particularly limited but may be, for example, 2.

The modeling unit 40 includes a low-pass filter (LPF) 71 in addition to the virtual modulator 41 and the virtual square law detector 42. The LPF 71 calculates the average of output values of the virtual square law detector 42 for N symbols. Thus, second intensity data calculated by the modeling unit 40 indicates the average intensity of N transmission symbols.

The process of updating the parameters of the modeling unit 40 in the optical transmitter 100 depicted in FIG. 7 and that in the optical transmitter 200 depicted in FIG. 14 are substantially the same. However, in the optical transmitter 200, the parameters of the modeling unit 40 are updated for every N symbols, and the modulator 1 is controlled according to the update results. Accordingly, the second embodiment allows for cost reduction and a decreased power consumption in comparison with the first embodiment.

Also in the second embodiment, transfer functions may be estimated using a phase retrieval algorithm. However, in the second embodiment, the transfer function of the modulator 1 is estimated in consideration of the transfer function of the LPF 71.

Third Embodiment

The optical transmitter 100B depicted in FIG. 11 transmits a polarization multiplexed optical signal. However, in this configuration, the polarization of an optical signal may rotate on a route from the combiner 23 to the optical splitter 21. In a case where the polarization of an optical signal rotates on the route from the combiner 23 to the optical splitter 21, the modeling unit 40 may not precisely indicate the state of the modulators 1X and 1Y. Thus, the modulators 1X and 1Y may not be precisely controlled.

Figure 15:
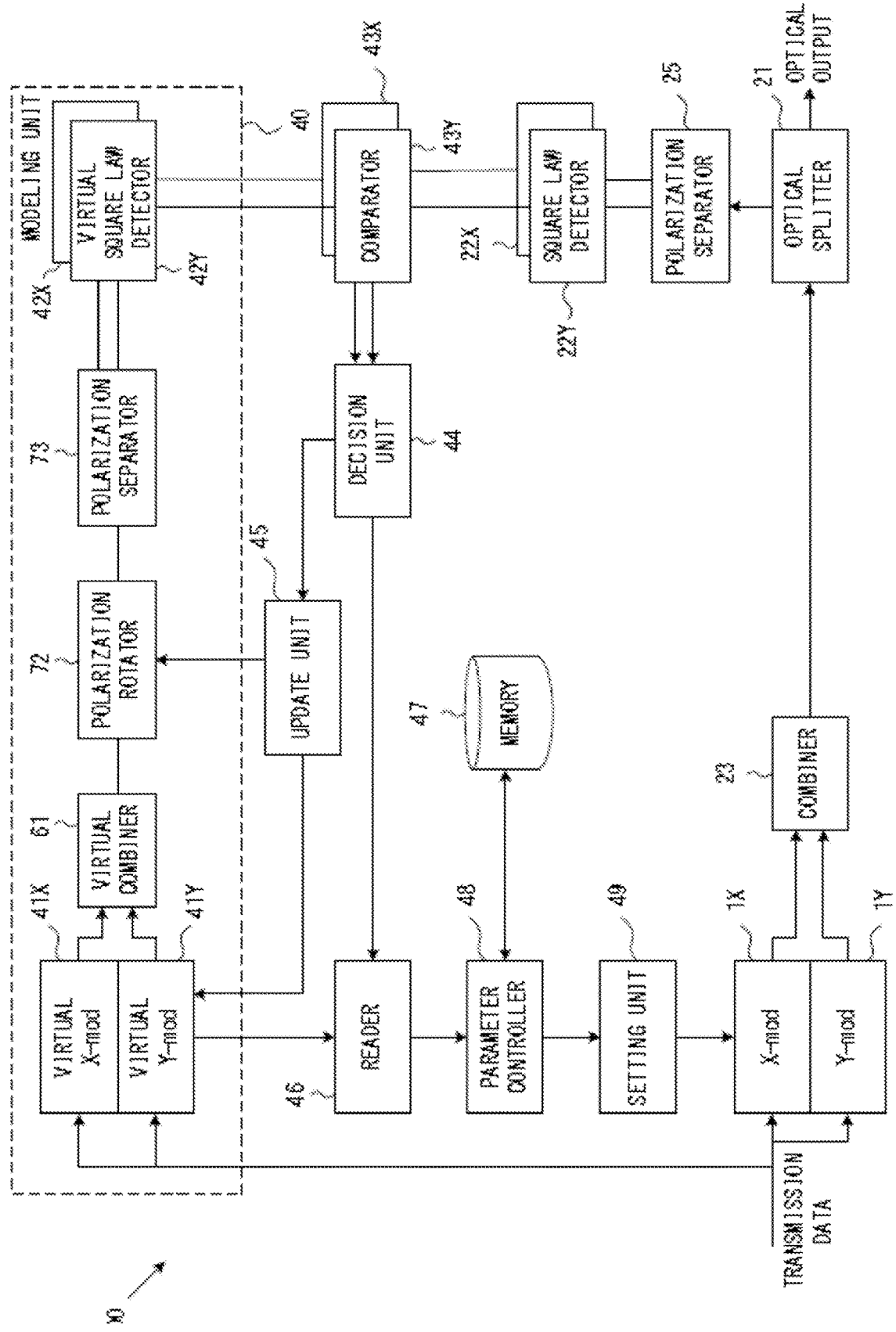
FIG. 15 illustrates an example of an optical transmitter in accordance with a third embodiment of the present invention.

FIG. 15 illustrates an example of an optical transmitter in accordance with a third embodiment of the present invention. Descriptions of elements or functions of an optical transmitter 300 depicted in FIG. 15 that are also seen in the optical transmitter 100B depicted in FIG. 11 are omitted herein.

In the optical transmitter 300, the optical splitter 21 splits a polarization multiplexed optical signal output from the combiner 23 and guides the split portion to a polarization separator 25. The polarization separator 25 separates input light into a pair of polarization components orthogonal to each other. The square law detectors 22X and 22Y each detect the intensity of each of the polarization components. Thus, first intensity data is obtained for each of the polarization components.

In the modeling unit 40, a polarization rotator 72 rotates the phase of an output signal of the virtual combiner 61. For example, the rotating process may be implemented by a rotation matrix expressed by formula 8. The amount of phase rotation is updated by the update unit 45.

$$\begin{pmatrix} \cos\theta & -\sin\theta \\ \sin\theta & \cos\theta \end{pmatrix} \quad (8)$$

A polarization separator 73 separates an output signal of the polarization rotator 72 into a pair of polarization components orthogonal to each other. The virtual square law detectors 42X and 42Y each calculate the intensity of each of the polarization components by using formula 3. Thus, second intensity data is obtained for each of the polarization components. The comparator 43X compares first intensity data with second intensity data for one of the polarizations.

The comparator 43Y compares first intensity data with second intensity data for the other of the polarizations.

The process of updating the parameters of the modeling unit 40 in the optical transmitter 100 depicted in FIG. 7 and that in the optical transmitter 300 depicted in FIG. 15 are substantially the same. However, in the optical transmitter 300, the update unit 45 updates the parameters of each virtual modulator (41X, 41Y) and updates the amount of rotation of the polarization rotator 72. In particular, the update unit 45 updates the parameters of each virtual modulator (41X, 41Y) and updates the amount of rotation of the polarization rotator 72, so as to reduce the differences between intensity data compared by the comparators 43X and 43Y for individual polarizations. The updating process continues until both of the differences fall below a threshold. When both of the differences fall below the threshold, the controller 30 controls the modulators 1X and 1Y according to the parameters of the virtual modulators 41X and 41Y.

As described above, in the third embodiment, the modulators 1X and 1Y are controlled in consideration of a rotation of the polarization of an optical signal on the route from the combiner 23 to the optical splitter 21. Thus, the quality of a modulated optical signal generated by the optical transmitter 300 is further improved.

The second and third embodiments may be combined. For example, the LPF 71 depicted in FIG. 14 may be provided on each of the output sides of the virtual square law detectors 42X and 42Y indicated in FIG. 15. In this case, the optical transmitter 300 also allows for a decreased power consumption and cost reduction for the square law detectors that include photodetectors and ADCs.

Fourth Embodiment

For example, the optical transmitter 100 in accordance with the first embodiment may generate intensity data for each symbol. Thus, the square law detector 22 includes a photodetector with a wide bandwidth and an ADC capable of performing high-speed sampling. However, while a communication system is performing a normal operation, it is rare for the state of an optical transmitter to suddenly change. Thus, while the optical transmitter is performing a normal operation, the square law detector 22 is not necessarily required to perform a high-speed operation.

Figure 16:
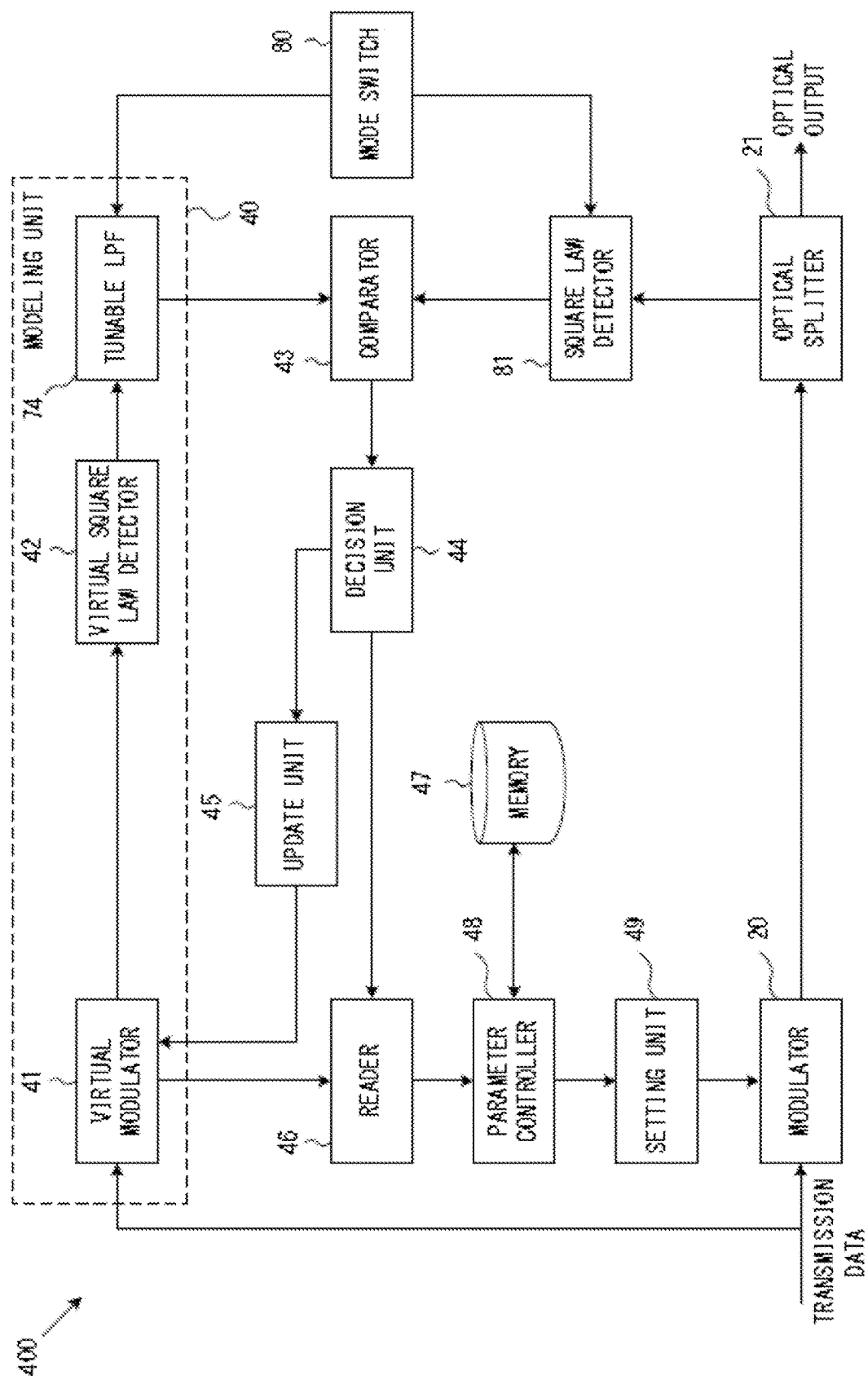
FIG. 16 illustrates an example of an optical transmitter in accordance with a fourth embodiment of the present invention.

FIG. 16 illustrates an example of an optical transmitter in accordance with a fourth embodiment of the present invention. Descriptions of elements or functions of an optical transmitter 400 depicted in FIG. 16 that are also seen in the optical transmitter 100 depicted in FIG. 7 are omitted herein.

A mode switch 80 gives an instruction to a square law detector 81 and a tunable LPF 74 in accordance with an operation mode of the optical transmitter 400. For example, the frequency characteristics of the optical transmitter 400 may be set or changed at the time of start of operations of the optical transmitter 400, at the time of changing a modulation scheme, and at the time of changing a baud rate. In the modulator 1 depicted in FIG. 1, the waveform shapers 5a and 5b compensate for the frequency characteristics of the DACs 11a and 11b, the drivers 12a and 12b, and the IQ modulator 13. The mode switch 80 instructs the square law detector 81 to perform high-speed sampling until a specified period of time elapses after the frequency characteristics have been set or changed. During other periods, the mode switch 80 instructs the square law detector 81 to perform low-speed sampling.

The square law detector 81 includes a photodetector and an ADC. The square law detector 81 switches the sampling rate of the ADC in accordance with an instruction from the mode switch 80. In particular, when an instruction indicating high-speed sampling is given, the square Law detector 81 operates the ADC at a speed such that the intensity of an optical signal is sampled for each symbol. When an instruction indicating low-speed sampling is given, the square law detector 81 decreases the sampling rate of the ADC by one-Nth. For example, N may be an integer that is larger than or equal to 2.

Alternatively, the square law detector 81 may include a high-speed photodetector and a low-speed photodetector. In this case, an optical signal is converted into an electric signal by using the high-speed photodetector when an instruction indicating high-speed sampling is given, and an optical signal is converted into an electric signal by using the low-speed photodetector when an instruction indicating low-speed sampling is given.

When an instruction indicating high-speed sampling is given, the variable LPF 74 does not perform LPF processing. In this case, a processing result provided by the virtual square law detector 42 is guided to the comparator 43. When an instruction indicating low-speed sampling is given, the variable LPF 74 performs LPF processing on a processing result provided by the virtual square law detector 42. In this case, averaged intensity data is guided to the comparator 43.

As described above, in the fourth embodiment, the operation speed of the square law detector 81 can be decreased when high-speed sampling does not need to be performed. Thus, power consumption is reduced in comparison with the first embodiment.

Optical Transceiver

Figure 17:
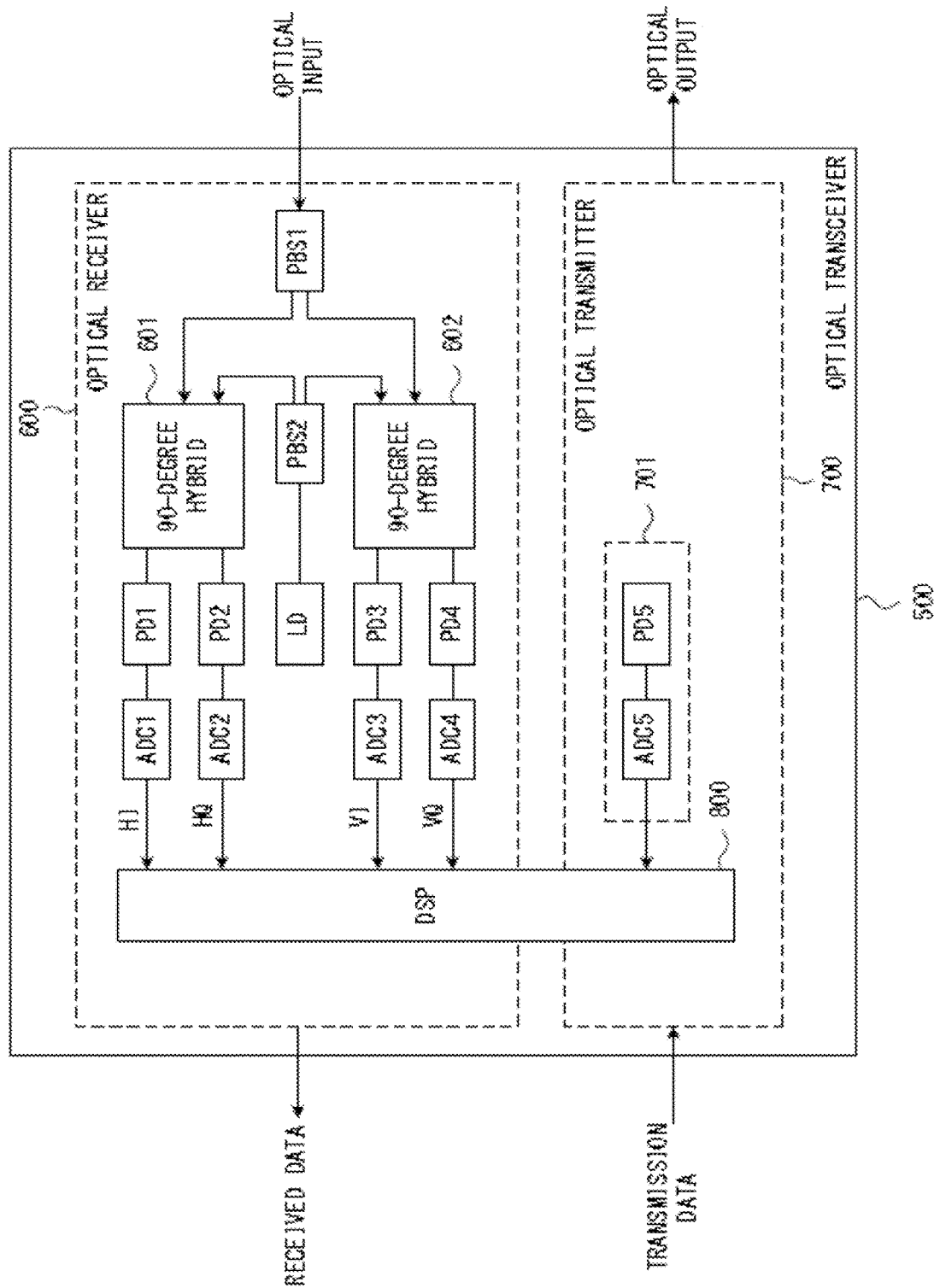
FIG. 17 illustrates an example of an optical transceiver that includes an optical transmitter in accordance with embodiments of the present invention.

FIG. 17 illustrates an example of an optical transceiver that includes an optical transmitter in accordance with embodiments of the present invention. An optical transceiver 500 in accordance with embodiments of the present invention includes an optical receiver 600 and an optical transmitter 700. For example, the optical transmitter 700 may be implemented by any of the optical transmitters in accordance with the first to fourth embodiments (100, 100B, 100C, 100D, 200, 300, or 400).

The optical receiver 600 is a digital coherent receiver and includes polarization beam splitters PBS1 and PBS2, a laser light source LD, 90-degree optical hybrid circuits 601 and 602, photodetectors PD1-PD4, and ADCs 1-4. The polarization beam splitter PBS1 separates an input optical signal into polarization components orthogonal to each other and guides these polarization components to the 90-degree optical hybrid circuits 601 and 602. The polarization beam splitter PBS2 separates continuous wave light generated by the laser light source LD into polarization components orthogonal to each other and guides these polarization components to the 90-degree optical hybrid circuits 601 and 602. The 90-degree optical hybrid circuit 601 extracts an I component and a Q component from input light by using continuous wave light and guides these components to the photodetectors PD1 and PD2. The photodetectors PD1 and PD2 each convert an input optical signal into an electric signal. The ADC1 and ADC2 respectively convert output signals of the photodetectors PD1 and PD2 into digital signals. Operations of the 90-degree optical hybrid circuit 602, the photodetectors PD3 and PD4, and the ADC3 and ADC4 are substantially the same as those of the 90-degree optical hybrid circuit 601, the photodetectors PD1 and PD2, and the ADC1 and ADC2. A DSP 800 recovers data from a received signal (HI, HQ, VI, VQ).

Although not illustrated, the optical transmitter 700 includes the modulator 1 depicted in FIG. 1. The optical transmitter 700 includes a photodetector PD5 and an ADC5 that are used as a square law detector. In this example, the DSP 2 depicted in FIG. 1 is implemented by the DSP 800. Although the optical receiver 600 and the optical transmitter 700 in this example share the DSP 800, the optical receiver 600 and the optical transmitter 700 may each be provided with a DSP.

In a case where the optical transceiver 500 is implemented using an optical integration technique such as silicon photonics, it is easy to add a photo detection set formed from a photodetector and an ADC. In this example, four photo detection sets are implemented in the optical receiver 600, and one photo detection set is implemented in the optical transmitter 700. The photodetectors PD1-PD5 are concurrently formed in the same fabrication process. The configurations of the ADC1-ADC5 are the same. The photo detection set implemented in the optical transmitter 700 is used as a square law detector.

Using the optical integration technique, the optical splitter 21 can easily be provided on the input side of the combiner 23. Thus, an optical transceiver that includes the optical transmitter 100C depicted in FIG. 12 can be easily fabricated.

In addition, an optical switch can be easily provided on a chip by using the optical integration technique. Thus, an optical transceiver that includes the optical transmitter 100D depicted in FIG. 13 can be easily fabricated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
   a modulator configured to generate an optical signal indicating transmission data;
   a square law detector configured to detect an intensity of the optical signal using a photodetector and output first intensity data indicating the detected intensity; and
   a processor configured to
   calculate, based on the transmission data, an electric field of the optical signal generated by the modulator by using parameters pertaining to a state of the modulator,
   calculate second intensity data indicating the intensity of the optical signal based on the calculated electric field,
   update the parameters so as to reduce a difference between the first intensity data and the second intensity data, and
   control the state of the modulator based on the parameters.

2. The optical transmitter according to claim 1, wherein the processor controls the state of the modulator based on the parameters when the difference is smaller than a specified threshold.

3. The optical transmitter according to claim 1, wherein the modulator is provided with an IQ modulator including a first Mach-Zehnder modulator, a second Mach-Zehnder modulator, and a phase adder that adjusts a phase difference between the first Mach-Zehnder modulator and the second Mach-Zehnder modulator,
the parameters include a first parameter indicating a deviation of a bias voltage of the first Mach-Zehnder modulator, and
the processor controls the bias voltage of the first Mach-Zehnder modulator based on a value of the first parameter obtained when the difference is smaller than the threshold.

4. The optical transmitter according to claim 3, wherein the parameters include a second parameter indicating a deviation of the phase difference between the first Mach-Zehnder modulator and the second Mach-Zehnder modulator, and
the processor controls a bias voltage applied to the phase adder based on a value of the second parameter obtained when the difference is smaller than the threshold.

5. The optical transmitter according to claim 1, wherein the processor averages the second intensity data through low-pass filter processing, and
the processor updates the first parameter based on a difference between the first intensity data and the averaged second intensity data.

6. The optical transmitter according to claim 1, wherein the modulator generates a first optical signal and a second optical signal from the transmission data,
a combiner that combines the first optical signal and the second optical signal to generate a polarization multiplexed optical signal is provided on an output side of the modulator,
the processor calculates an electric field of the first optical signal and an electric field of the second optical signal based on the transmission data,
the processor performs rotational processing for the electric field of the first optical signal and the electric field of the second optical signal in a process between the calculation of the electric fields and the calculation of the second intensity data, and
the processor controls an amount of rotation of the rotational processing based on the difference between the first intensity data and the second intensity data.

7. The optical transmitter according to claim 1, wherein the processor has a low-pass filter function that averages the second intensity data,
the processor does not average the second intensity data when the square law detector generates the first intensity data at a first sampling rate, and
the process or averages the second intensity data when the square law detector generates the first intensity data at a second sampling rate that is lower than the first sampling rate.

8. A method for controlling an optical transmitter including a modulator that generates an optical signal indicating transmission data, the method comprising:
generating first intensity data indicating an intensity of the optical signal by using a photodetector;
calculating, based on the transmission data, an electric field of the optical signal generated by the modulator by using parameters pertaining to a state of the modulator;
calculating second intensity data indicating the intensity of the optical signal based on the electric field;
updating the parameters so as to reduce a difference between the first intensity data and the second intensity data; and
controlling the state of the modulator based on the parameters.

9. An optical transceiver that includes an optical transmitter and an optical receiver, wherein
the optical transmitter includes:
- a modulator configured to generate an optical signal indicating transmission data;
- a square law detector configured to detect an intensity of the optical signal using a photodetector and output first intensity data indicating the detected intensity; and
- a processor configured to
  - calculate, based on the transmission data, an electric field of the optical signal generated by the modulator by using parameters pertaining to a state of the modulator,
  - calculate second intensity data indicating the intensity of the optical signal based on the calculated electric field,
  - update the parameters so as to reduce a difference between the first intensity data and the second intensity data, and
  - control the state of the modulator based on the parameters.

\* \* \* \* \*